United States Patent
Yun et al.

(10) Patent No.: US 11,677,272 B2
(45) Date of Patent: Jun. 13, 2023

(54) WIRELESS POWER TRANSMITTING DEVICE AND WIRELESS POWER RECEIVING DEVICE

(71) Applicant: ELECTRONICS AND TELECOMMUNICATIONS RESEARCH INSTITUTE, Daejeon (KR)

(72) Inventors: Je Hoon Yun, Daejeon (KR); Sang Won Kim, Daejeon (KR); Seong Min Kim, Daejeon (KR); Jung Ick Moon, Daejeon (KR); Woo Jin Byun, Daejeon (KR); Dong Won Jang, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/509,277

(22) Filed: Oct. 25, 2021

(65) Prior Publication Data

US 2022/0131417 A1    Apr. 28, 2022

(30) Foreign Application Priority Data

Oct. 27, 2020   (KR) .................. 10-2020-0140661

(51) Int. Cl.
*H02J 50/12*   (2016.01)
*H01F 38/14*   (2006.01)
*H02J 50/40*   (2016.01)

(52) U.S. Cl.
CPC .............. *H02J 50/12* (2016.02); *H01F 38/14* (2013.01); *H02J 50/402* (2020.01)

(58) Field of Classification Search
None
See application file for complete search history.

(56) References Cited

U.S. PATENT DOCUMENTS 9,246,336 B2    1/2016  Kurs et al.
2013/0127253 A1*  5/2013  Stark ................. H01F 38/14
                                                          307/104

(Continued)

FOREIGN PATENT DOCUMENTS

KR   10-2011-0035196 A   4/2011
KR   10-2012-0049017 A   5/2012

(Continued)

OTHER PUBLICATIONS

Maja Skiljo et al., "Increasing the Radiation Efficiency and Resistance of Electrically Small Spherical Helical Antenna for Wireless Power Transfer", 2013 21st International Conference on Software, Telecommunications and Computer Networks—(SoftCOM 2013), 2013, pp. 1-5, doi: 10.1109/SoftCOM.2013.6671882.

(Continued)

*Primary Examiner* — Adi Amrany
(74) *Attorney, Agent, or Firm* — LRK Patent Law Firm

(57) ABSTRACT

A wireless power transmitting device includes: an upper coil including a first tubular spiral coil and a first planar spiral coil disposed beneath the first tubular spiral coil; a lower coil including a second planar spiral coil disposed to face the first planar spiral coil and a second tubular spiral coil disposed beneath the second planar spiral coil; a connecting stub configured to connect the upper coil and the lower coil to each other; and a power source configured to supply a power to the upper coil or the lower coil. The first planar spiral coil and the second planar spiral coil generate an electric field and a magnetic field in a resonance state to transfer at least some of the power from the power source to an external (Continued)

wireless power receiving device through the electric field and the magnetic field.

16 Claims, 21 Drawing Sheets

(56) References Cited

U.S. PATENT DOCUMENTS

| | | |
|---|---|---|
| 2013/0181541 A1 | 7/2013 | Karalis et al. |
| 2013/0257173 A1 | 10/2013 | Saitoh |
| 2017/0155195 A1 | 6/2017 | Yun et al. |
| 2018/0130599 A1 | 5/2018 | Yun et al. |
| 2020/0203994 A1 | 6/2020 | Cho et al. |

FOREIGN PATENT DOCUMENTS

| | | |
|---|---|---|
| KR | 10-2012-0127231 A | 11/2012 |
| KR | 10-2013-0130195 A | 12/2013 |
| KR | 10-1584800 B1 | 1/2016 |

OTHER PUBLICATIONS

Y. Kim et al., "Investigation of coupled mode behaviour of electrically small meander antennas", Electronics Letters, vol. 43 No. 23, Nov. 8, 2007.
Andre Kurs et al. "Wireless Power Transfer via Strongly Coupled Magnetic Resonances", Science vol. 317, Jul. 6, 2007.
Hui-Fen Huang et al., "A Spiral Electrically Small Magnetic Antenna With High Radiation Efficiency for Wireless Power Transfer", IEEE Antennas and Wireless Propagation Letters, vol. 15, 2016.

* cited by examiner

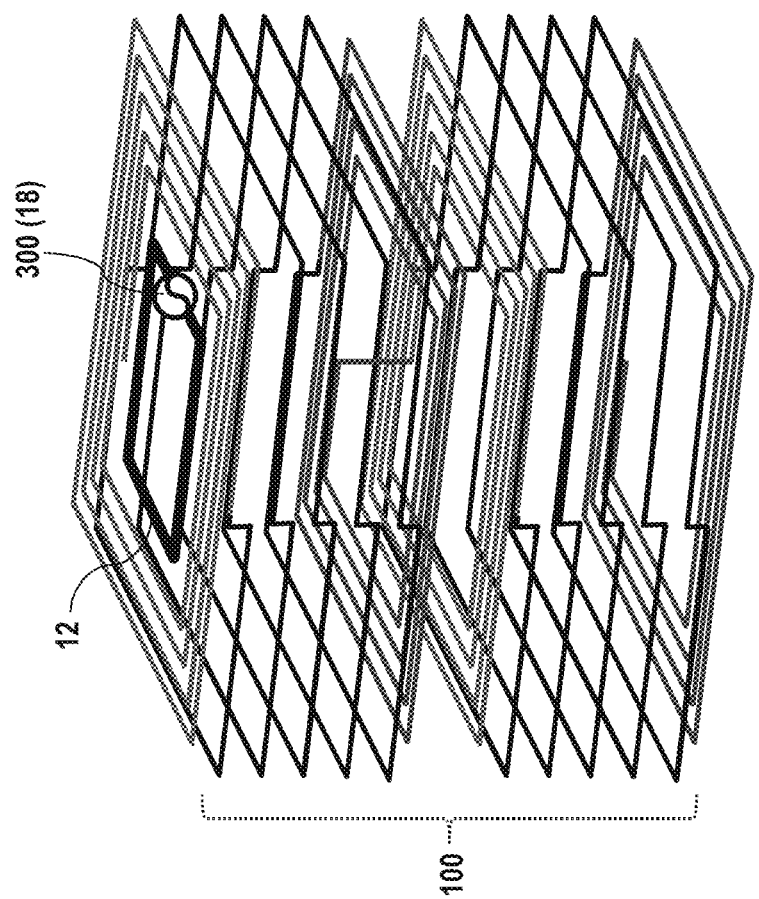
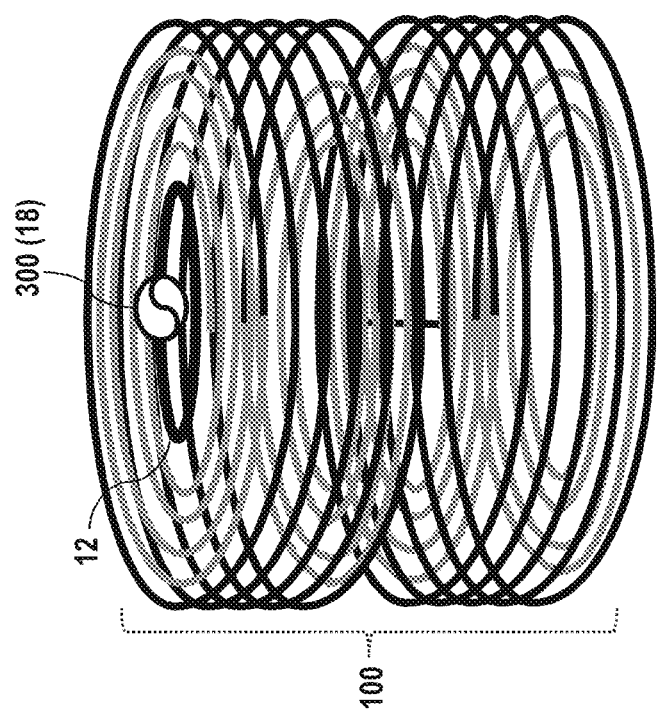

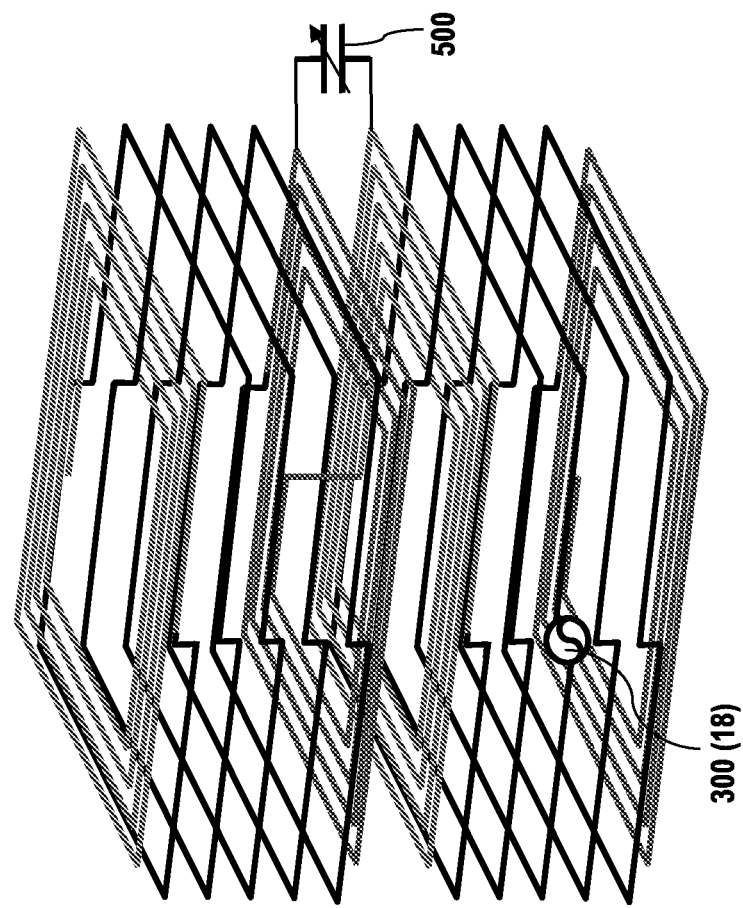
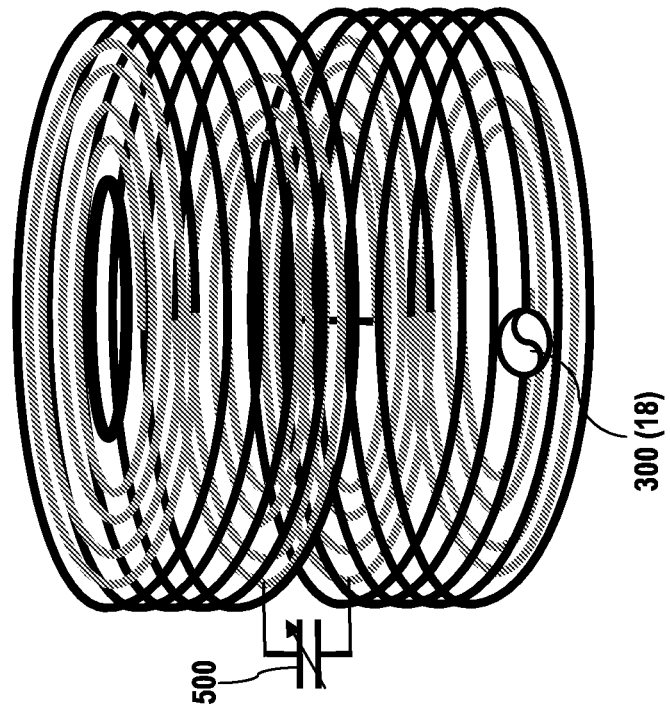

WIRELESS POWER TRANSMITTING DEVICE AND WIRELESS POWER RECEIVING DEVICE

CROSS-REFERENCE TO RELATED APPLICATION

The present application claims a convention priority to Korean Patent Application No. 10-2020-0140661 filed on Oct. 27, 2020, with the Korean Intellectual Property Office (KIPO), the entire content of which is incorporated herein by reference.

BACKGROUND

1. Technical Field

The present disclosure relates to a wireless power transmitter and a wireless power receiver and, more particularly, to a wireless power transmitter and a wireless power receiver using a resonance coil.

2. Description of Related Art

A wireless power transfer refers to a technology for transmitting power between devices without using wires. Various schemes such as an electromagnetic wave radiation, a magnetic induction, a magnetic resonance, and an electric resonance may be proposed for the wireless power transfer. The magnetic resonance scheme transfers the power by a coupling of a magnetic field between a wireless power transmitting device and a wireless power receiving device when a magnetic resonance occurs. The electric resonance scheme transfers the power by a coupling of an electric field between the wireless power transmitting device and the wireless power receiving device when an electric resonance occurs.

U.S. patent publication No. US2018-130599A1 entitled WIRELESS POWER TRANSMISSION DEVICE FOR TRANSMITTING POWER USING MAGNETIC FIELD AND ELECTRIC FIELD, AND WIRELESS POWER RECEIVING DEVICE FOR RECEIVING POWER FROM THE WIRELESS POWER TRANSMISSION DEVICE discloses an electromagnetic resonance scheme, in which the power is transferred by a coupling of the magnetic and electric fields between the wireless power transmitting device and the wireless power receiving device. The scheme disclosed in the literature increases the total coupling of the magnetic and electric fields between the wireless power transmitting device and the wireless power receiving device compared with the magnetic resonance scheme and the electric resonance scheme so as to enable a long range power transfer and enhance a power transmission efficiency.

A wireless power transmitting device according to the electromagnetic resonance scheme utilizes a strong current flowing through a central portion of a resonance coil to generate a highly coupled the magnetic field while utilizing lots of charges present at both ends of the resonance coil to generate a highly coupled electric field. Since the current and charges are distributed throughout the wire, however, a difference in charge distribution may exist in the central portion of the resonance coil in addition to the current, and the current flow may exist at both ends of the resonance coil in addition to the charges. Thus, it is desirable to taking into account the charges that may present in the central portion the resonance coil and the current flow at both ends of the resonance coil in order to increase a range over which the power transmission is possible, to enhance the power transmission efficiency, and to lower the resonant frequency band or reduce a size of the resonance coil.

SUMMARY

Provided is an electromagnetic coupling-based wireless power transmitting device that enables to increase a range over which the power transmission is possible and allows to enhance a power transmission efficiency.

Provided is an electromagnetic coupling-based wireless power transmitting device of which resonant frequency may be adjusted easily.

According to an aspect of an exemplary embodiment, a wireless power transmitting device includes: an upper coil comprising a first tubular spiral coil and a first planar spiral coil disposed beneath the first tubular spiral coil; a lower coil comprising a second planar spiral coil disposed to face the first planar spiral coil and a second tubular spiral coil disposed beneath the second planar spiral coil; a connecting stub configured to connect the upper coil and the lower coil to each other; and a power source configured to supply a power to the upper coil or the lower coil. The first planar spiral coil and the second planar spiral coil generate an electric field and a magnetic field in a resonance state to transfer at least some of the power from the power source to an external wireless power receiving device through the electric field and the magnetic field.

The wireless power transmitting device may further include a capacitor connected between the upper coil and the lower coil in an electrical parallel with the connecting hub.

The upper coil may further include a third planar spiral coil disposed on the first tubular spiral coil, and the lower coil may further include a fourth planar spiral coil disposed beneath the second tubular spiral coil.

Each of the first and second tubular spiral coils may include a plurality of turns of wire having a shape wound along an outer circumferential surface of one selected from a three-dimensional object group consisting of a rectangular parallelepiped, a polygon column, a cylinder, an elliptic cylinder. Each of the first and second planar spiral coils may include a spirally wound conductor having a shape of a rectangular, polygonal, circular, or oval disk.

The wireless power transmitting device may further include a power feeding loop disposed to be parallel with the upper coil and the lower coil and spaced apart from the upper coil and the lower coil. The power source may supply the power to the upper coil or the lower coil through the power feeding loop.

The power supply loop may receive an electrical energy from the power source and generates an electromagnetic field to indirectly supply the power to the upper coil or the lower coil.

A length of the connecting stub may be adjustable to allow a change of a resonance frequency of the wireless power transmitting device.

According to another aspect of an exemplary embodiment, a wireless power receiving device includes: an upper coil comprising a first tubular spiral coil and a first planar spiral coil disposed beneath the first tubular spiral coil; a lower coil comprising a second planar spiral coil disposed to face the first planar spiral coil and a second tubular spiral coil disposed beneath the second planar spiral coil; a connecting stub configured to connect the upper coil and the lower coil to each other; and a load configured to receive a power from the upper coil or the lower coil. The first planar spiral coil and the second planar spiral coil are configured to receive power transmitted by an external wireless power transmitting device and deliver the power to the load.

The wireless power receiving device may further include a capacitor connected between the upper coil and the lower coil in an electrical parallel with the connecting hub.

The upper coil further include a third planar spiral coil disposed on the first tubular spiral coil, and the lower coil further include a fourth planar spiral coil disposed beneath the second tubular spiral coil.

Each of the first and second tubular spiral coils may include a plurality of turns of wire having a shape wound along an outer circumferential surface of one selected from a three-dimensional object group consisting of a rectangular parallelepiped, a polygon column, a cylinder, an elliptic cylinder. Each of the first and second planar spiral coils may include a spirally wound conductor having a shape of a rectangular, polygonal, circular, or oval disk.

The wireless power receiving device may further include a power delivery loop disposed to be parallel with the upper coil and the lower coil and spaced apart from the upper coil and the lower coil. The load receives the power from the upper coil or the lower coil through the power delivery loop.

The power delivery loop may provide the load with an electrical energy associated with a current induced by an electromagnetic field generated by the upper coil or the lower coil.

A length of the connecting stub may be adjustable to allow a change of a resonance frequency of the wireless power transmitting device.

According to an exemplary embodiment of the present disclosure, the resonant frequency of the wireless power transmitting device may be lowered easily or the size of the resonance coil may be reduced. In particular, the resonant frequency of the wireless power transmitting device may be adjusted by use of a capacitor.

On the other hand, the wireless power transmitting device according to an exemplary embodiment of the present disclosure enables the medium-range wireless power transmission without significant interference or serious power loss.

BRIEF DESCRIPTION OF THE DRAWINGS

In order that the disclosure may be well understood, there will now be described various forms thereof, given by way of example, reference being made to the accompanying drawings, in which:

FIG. 18A illustrates a cylindrical electromagnetically coupled resonance coil of a loop built-in indirectly fed structure;

FIG. 18B illustrates a rectangular parallelepiped electromagnetically coupled resonance coil of a loop built-in indirectly fed structure;

FIGS. 24A and 24B illustrate electromagnetically coupled resonance coils of the asymmetric directly-fed structure according to another exemplary embodiments of the present disclosure.

Figure 1:
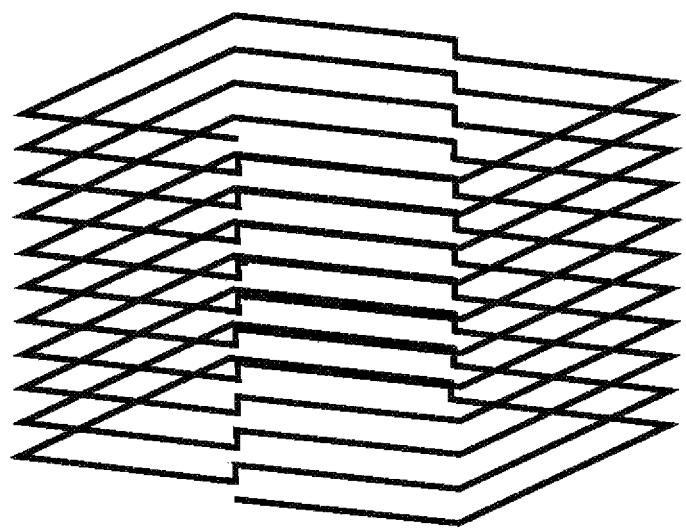
FIG. 1 is a perspective view of a conventional magnetically coupled resonance coil.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

The words "front", "rear", "upper", "lower", "left side", "right side", "horizontal", "vertical", and the like are used to herein to mean directions that may be recognized in the drawings, but the shape, location, or direction of the component is not limited by the words.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanied drawings. In the following description and the drawings, similar or corresponding components may be designated by the same or similar reference numerals to facilitate an overall understanding of the present disclosure and replicate description of them will be omitted for simplicity.

The resonance technology for a wireless power transmission is different, in its power transfer principle, from a wireless power induction technology and an antenna radiation technology. The induction refers to a technology of transferring the power by a coupling caused by an electric or magnetic field induction between transmitting and receiving coils installed adjacent to each other. The induction may allow a transfer of a large amount of power when transmitting and receiving coils are close to each other, but the transmission efficiency may vary greatly depending on positions of the transmitting and receiving coils. Meanwhile, the antenna technology refers to a technology of transmitting the power wirelessly using an electromagnetic field in a far-field by increasing an amount of spatial radiation, narrowing a beam width, or aligning a plurality of antennas so that their signals are in phase at a receiving point. The antenna technology may be advantageous for a long-range power transfer but has problems of an increase in an amount of ambient interference and a difficulty in the transfer of a large scale power transfer.

On the other hand, the resonance technology transfers the power by generating a resonance in coils to form a strong electric and magnetic fields around the coils. The resonance technology may allow the power transfer in a wider range than the induction, and may enable to reduce a waste of power and an effect of an ambient interference compared with the antenna technology and may facilitate the transfer of a large amount of power. The resonance technology may be divided into an electrically coupled resonance, a magnetically coupled resonance, and an electromagnetically coupled resonance.

Figure 2:
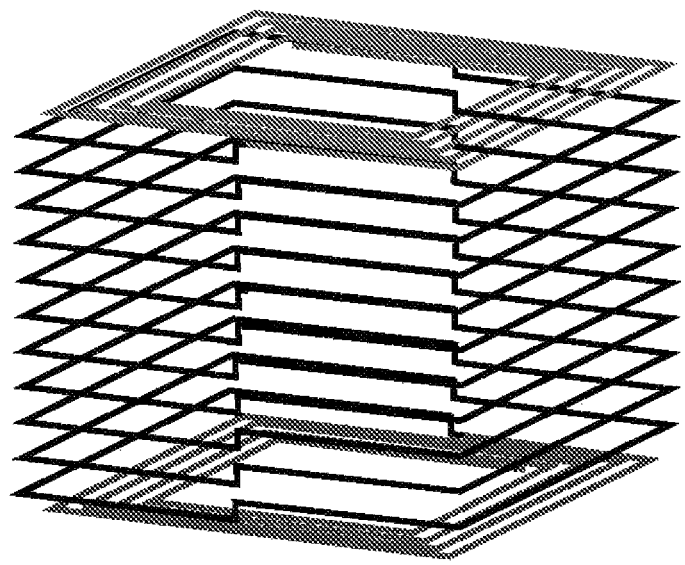
FIG. 2 is a perspective view of a conventional electromagnetically coupled resonance coil.

FIG. 1 shows an example of a conventional magnetically coupled resonance coil, and FIG. 2 shows an example of a conventional electromagnetically coupled resonance coil. A primary coil operating in the magnetically coupled resonance environment may generate a strong magnetic field in a central region of its conducting wire and emit a magnetic flux in its vicinity so that a current is induced in a near-by secondary coil. Thus, the primary coil can transfer the power to the secondary coil through a magnetic field coupling. The magnetically coupled resonance utilizes a large current that may flow the central region of the conducting wire when a resonance occurs. Meanwhile, a primary coil operating in the electrically coupled resonance environment may generate a strong electric field in its vicinity so that a current is capacitively induced in a near-by secondary coil. Thus, the primary coil can transfer the power to the secondary coil through an electric field coupling. The electrically coupled resonance utilizes a large amount of charges that may be present at an end portion of the conducting wire when the resonance occurs.

Referring to FIG. 2, the primary coil and the secondary coil suitable for establishing the electromagnetically coupled resonance may include planar spiral coils disposed at both ends, i.e. on the top and bottom, and a tubular spiral coil disposed between the planar spiral coils. The planar spiral coils may act as electric coupling portions, and the tubular spiral coil may act as a magnetic coupling portion. When the resonance occurs, a large current may flow the central region of the tubular spiral coil, and a large amount of charges may be present at the planar spiral coils at both ends. The large current flowing the central region of the tubular spiral coil may generate a strong magnetic field in the magnetic coupling portion, and the large amount of charges present at the planar spiral coils may generate a strong electric field in the vicinity of the planar spiral coils. Thus, the primary coil may generate both the electric field and the magnetic field around the secondary coil and utilize a combination of the electric field and the magnetic field in the wireless power transfer so as to enable a medium-range power transfer and increase a power transmission efficiency.

Figure 3:
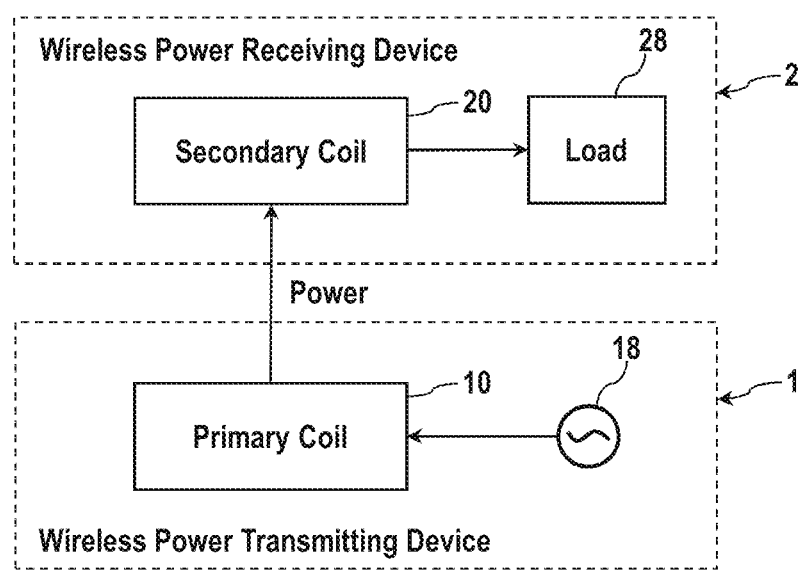
FIG. 3 is a block diagram of a wireless power transfer system according to an exemplary embodiment of the present disclosure.

FIG. 3 is a block diagram of a wireless power transfer system according to an exemplary embodiment of the present disclosure. The wireless power transfer system may include a wireless power transmitting device 1 and a wireless power receiving device 2. The wireless power transmitting device 1 may transmit power to the wireless power receiving device 2 by using a strong electric field and magnetic field that may be present when an electromagnetic resonance phenomenon occurs. The wireless power transmitting device 1 may include a primary coil 10 and a power source 18, and the wireless power receiving device 2 may include a secondary coil 20 and a load 28 such as a battery to be charged. According to the present embodiment, the electric power from the power source 18 may be directly fed to the primary coil 10. When the electromagnetic resonance phenomenon occurs in the primary coil 10, the primary coil 10 generates a strong electric and magnetic fields. The primary coil 10 may transfer lots of power to the secondary coil 20 through an induction caused by the strong electric and magnetic fields. The power of the current induced in the secondary coil 20 may be provided to the load 28.

The secondary coil 20 may have a same structure, shape, and size as the primary coil 10, but the present disclosure is not limited thereto. That is, the secondary coil 20 may have a different structure, shape, or size from the primary coil 10. In the following description, exemplary embodiments of the present disclosure are described in terms of the primary coil 10, but it should be noted that the description of the primary coil 10 may equally or similarly be applied to the secondary coil 20 except for essential differences such as those in members connected to the coils 10 and 20 such as the power source or the load.

Figure 4:
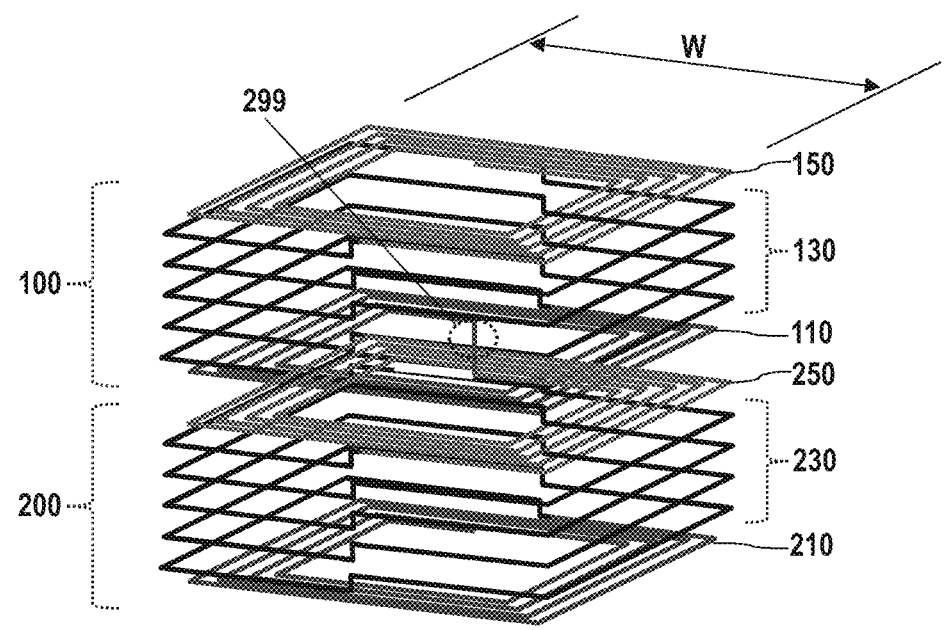
FIG. 4 is a schematic perspective view of an electromagnetically coupled resonance coil according to an exemplary embodiment of the present disclosure.
Figure 5:
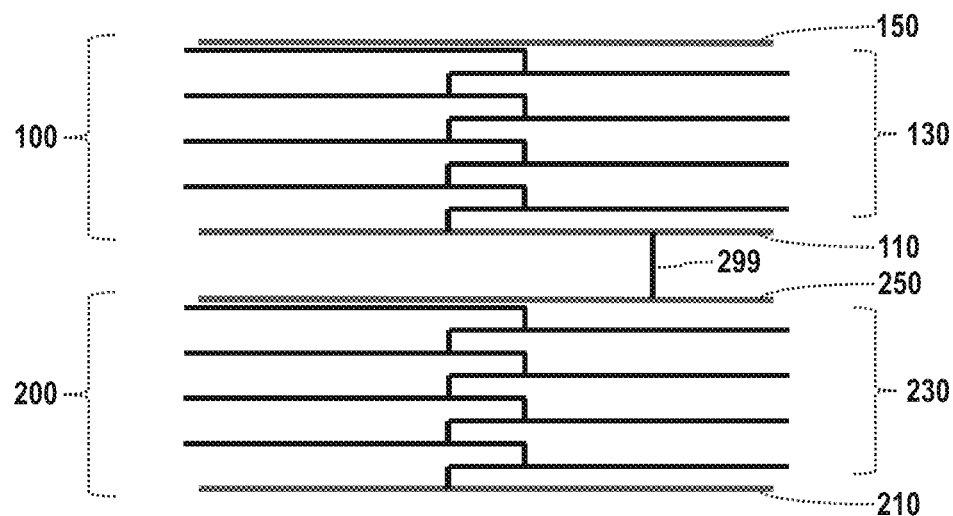
FIG. 5 is a schematic front view of the electromagnetically coupled resonance coil according to an exemplary embodiment of the present disclosure.

FIG. 4 is a schematic perspective view of an electromagnetically coupled resonance coil according to an exemplary embodiment of the present disclosure, and FIG. 5 is a schematic front view of the electromagnetically coupled resonance coil according to an exemplary embodiment of the present disclosure. The electromagnetically coupled resonance coil shown in the drawings may be used as the primary coil 10 and/or the secondary coil 20. The electromagnetically coupled resonance coil may include an upper coil 100 and a lower coil 200 connected to the upper coil 100. Each of the upper coil 100 and the lower coil 200 may have a structure similar to that of the resonance coil shown in FIG. 2, and thus the electromagnetically coupled resonance coil may have a structure in which two resonance coils of FIG. 2 are coupled up and down.

In detail, the upper coil 100 may include a lower spirally-wound coil 110 disposed at its lower portion, a tubular wound coil 130 disposed on the disk-shaped spirally-wound coil 110, and an upper spirally-wound coil 150 disposed on the tubular wound coil 130. The upper coil 100 has a substantially rectangular shape when viewed from above, and thus the upper coil 100 may have a shape of a rectangular parallelepiped as a whole. The lower coil 200 has a shape similar to that of the upper coil 100. That is, the lower coil 200 may include a lower spirally-wound coil 210 disposed at its lower portion, a tubular wound coil 230 disposed on the disk-shaped spirally-wound coil 210, and an upper spirally-wound coil 250 disposed on the tubular wound coil 230. The lower coil 200 has a substantially rectangular shape when viewed from above, and thus the lower coil 200 may have a shape of a rectangular parallelepiped as a whole.

Figure 6:
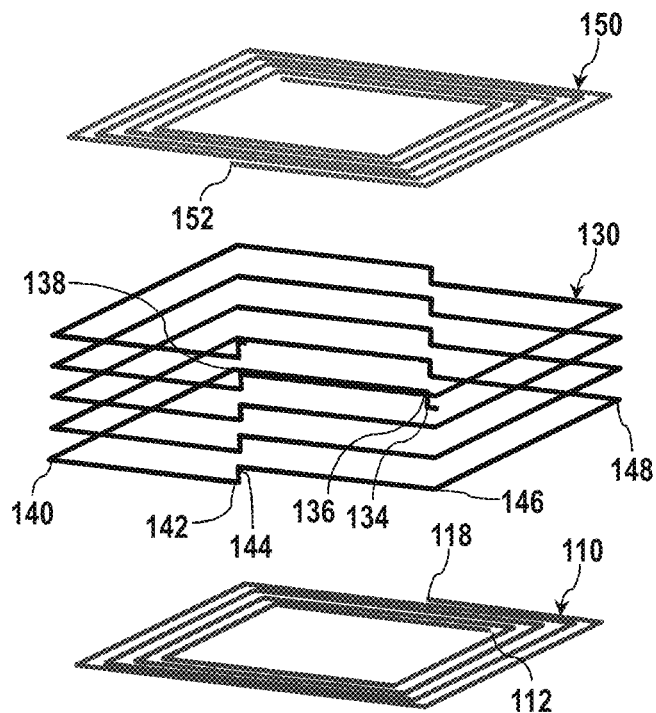
FIG. 6 is a schematic exploded view of an upper coil shown in FIGS. 4 and 5.

Referring to FIG. 6, in the upper coil 100, the lower spirally-wound coil 110 is flexed periodically multiple times from an inner or outer starting point 112 and is spirally wound in a plane, thereby forming a disk shape. The tubular wound coil 130 extends upward from the end point 118 of the lower spirally-wound coil 110. In detail, the tubular wound coil 130 includes multiple layers of windings, and the winding of each layer may be implemented by forming an upward flex 134, three horizontal flexes 136, 138, and 140, and an upward flex 142, and three horizontal flexes 144, 146, and 148. The upper spirally-wound coil 150 is flexed periodically multiple times from a starting point 152 corresponding to a top end point of the tubular wound coil 130 and is spirally wound in a plane, thereby forming a disk shape.

Figure 7:
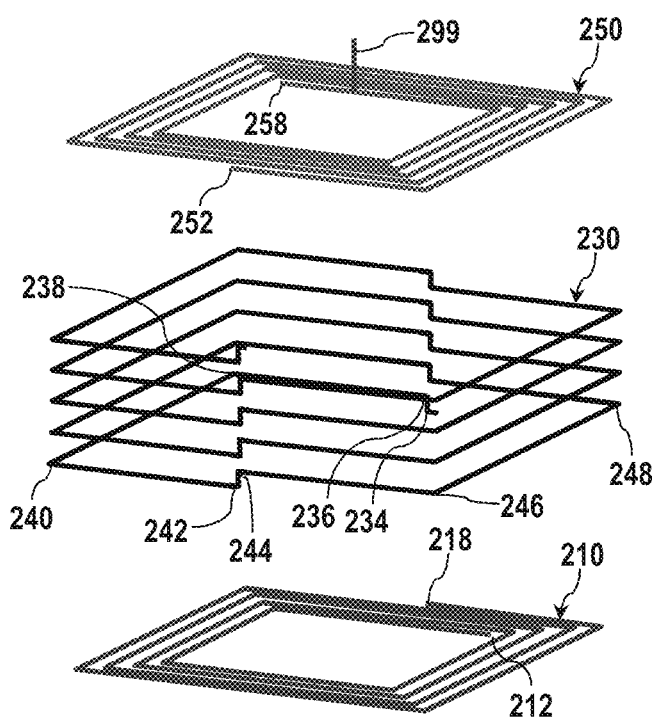
FIG. 7 is a schematic exploded view of a lower coil shown in FIGS. 4 and 5.

Referring to FIG. 7, in the lower coil 200, the lower spirally-wound coil 210 is flexed periodically multiple times from an inner or outer starting point 212 and is spirally wound in a plane, thereby forming a disk shape. The tubular wound coil 230 extends upward from the end point 218 of the lower spirally-wound coil 210. In detail, the tubular wound coil 230 includes multiple layers of windings, and the winding of each layer may be implemented by forming an upward flex 234, three horizontal flexes 236, 238, and 240, and an upward flex 242, and three horizontal flexes 244, 246, and 248. The upper spirally-wound coil 250 is flexed periodically multiple times from a starting point 252 corresponding to a top end point of the tubular wound coil 230 and is spirally wound in a plane, thereby forming a disk shape.

A connection stub 299 may extend vertically in the drawing to connect one point of the upper spirally-wound coil 250 of the lower coil 200 to one point of the lower spirally-wound coil 110 of the upper coil 100. For example, the spirally-wound coil 250 may protrude upward and extend from an end point 258 of the upper spirally-wound coil 250, and an upper end of the connection stub 299 may be connected to the starting point 112 of the lower spirally-wound coil 110 of the upper coil 100. However, the present disclosure is not limited thereto, and the connection stub 299 may be connected to another point of the lower coil 200 and another point of the upper coil 100.

In the electromagnetically coupled resonance coil operating as the primary coil 10, the planar spiral coils 150 and 210 present at both ends of the primary coil 10 may allow a current to pass in addition to retaining a large charge distribution. Accordingly, even though the planar spiral coils 150 and 210 operate as the electric coupling portions that generate a strong capacitive resonance based on a large distribution of charges, the electric coupling portions may also generate an inductance that generates the magnetic field owing to the spiral structure. On the other hand, in the primary coil 10 described above, the two planar spiral coils 110 and 250 are disposed to face each other between the tubular spiral coils 130 and 230 serving as the magnetic coupling portions. Even though the tubular spiral coils 130 and 230 operate as the magnetic coupling portions that generate a strong inductive resonance based on the current of a large magnitude, the magnetic coupling portions may generate a capacitance at the same time due to a pair of the planar spiral coils 110 and 250 causing a large capacitance and disposed in the magnetic coupling portions.

As a result, in the primary coil 10 of the present disclosure, the magnetic coupling portion may generate a capacitance together with a large inductance, and the electric coupling portion may generate an inductance together with a large capacitance. Contrary to the conventional primary coil shown in FIG. 2 where the tubular spiral coil corresponding to the magnetic coupling portion has a structure of a low utilization of a potential energy caused by the difference in charge amount distribution and has a small capacitance, the primary coil 10 of the present disclosure solves such a problem and has an increased capacitance of the magnetic coupling portion so as to facilitate of a tuning of an resonance frequency and a long range power transfer. The operation of the primary coil 10 will be described in more detail with reference to FIGS. 8-10.

Figure 8:
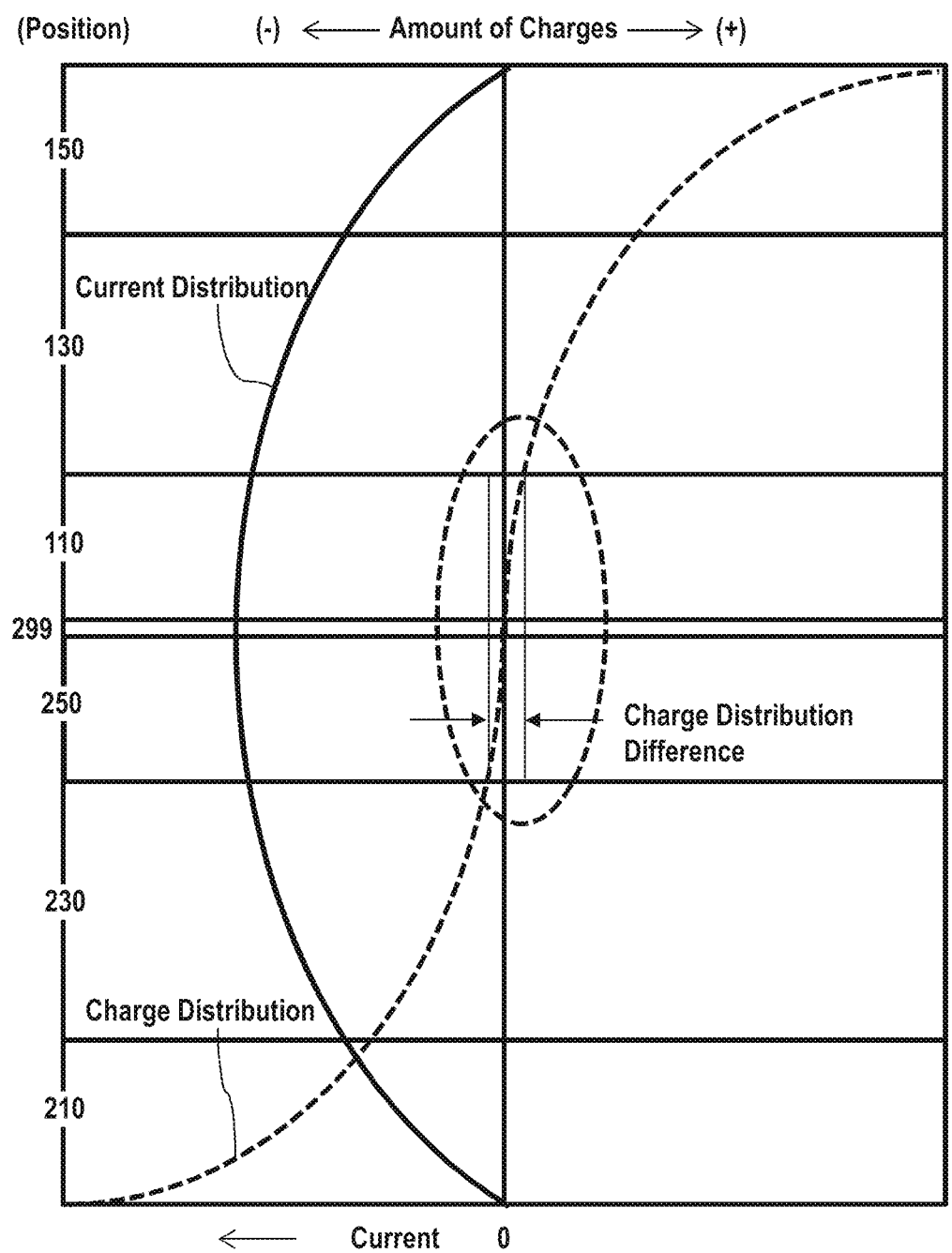
FIG. 8 is a graph showing charge and current distributions according to positions in the electromagnetically coupled resonance coil shown in FIG. 4.

FIG. 8 is a graph showing charge and current distributions according to positions in the electromagnetically coupled resonance coil shown in FIG. 4 operating as the primary coil 10. When the electromagnetic resonance occurs, the current in the primary coil 10 is the maximum at the lower planar spiral coil 110 of the upper coil 100, the connecting protrusion 299 connecting the upper coil 100 and the lower coil 200, and upper planar spiral coil 250 of the lower coil 200. The magnitude of the current becomes smaller the father from the central region of the primary coil 10 and is the minimum at the upper planar spiral coil 150 of the upper coil 100 and the lower planar spiral coil 210 of the lower coil 200. On the other hand, the amount of electric charges distributed in the primary coil 10 is the maximum in the upper planar spiral coil 150 of the upper coil 100 and the lower planar spiral coil 210 of the lower coil 200 and is the minimum in the central region of the primary coil 10. However, even though the size is small, there exists a charge distribution difference between the lower planar spiral coil 110 of the upper coil 100 and the upper planar spiral coil 250 of the lower coil 200 in the magnetic coupling portion, which is utilized to enhance the coupling between the primary coil and the secondary coil according to the present disclosure.

Figure 9A:
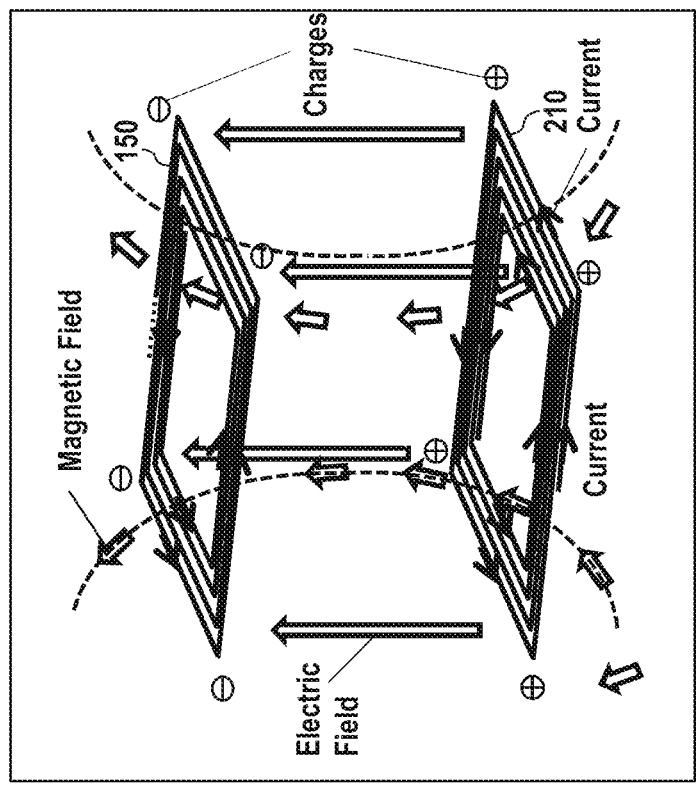
FIG. 9A is an illustration of an electric field and a magnetic field generated by planar spiral coils at the top and bottom of the electromagnetically coupled resonance coil.
Figure 9B:
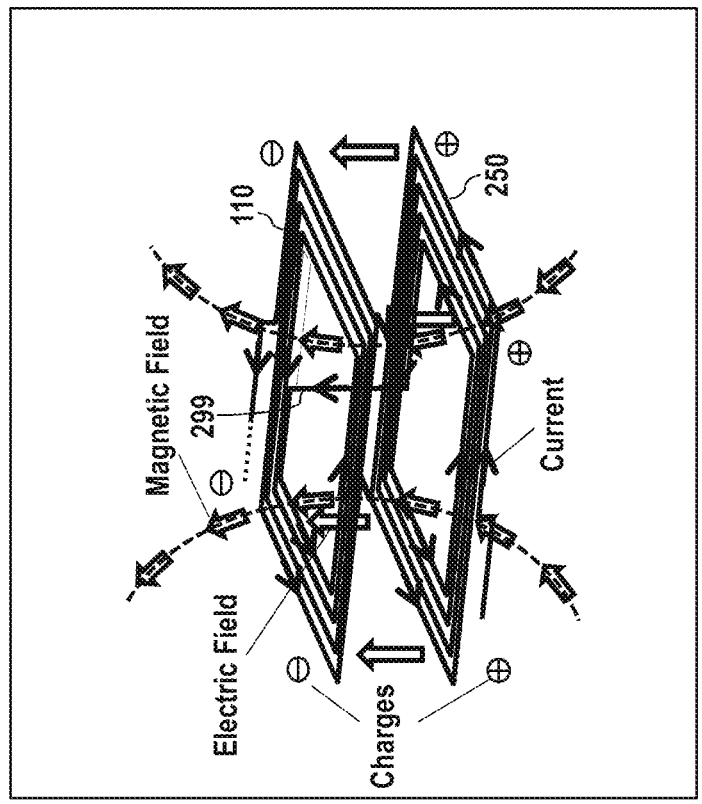
FIG. 9B is an illustration of an electric field and a magnetic field generated by planar spiral coils in a central region of the electromagnetically coupled resonance coil.

FIG. 9A is an illustration of the electric field and the magnetic field generated by the planar spiral coils 150 and 210 at the top and bottom of the primary coil 10, and FIG. 9B is an illustration of the electric field and the magnetic field generated by the planar spiral coils 110 and 250 in the central region of the primary coil 10.

Referring to FIG. 9A, the electric coupling portion at the top and bottom of the primary coil 10, which includes the planar spiral coils 150 and 210, may generate the magnetic coupling while maintaining the electric coupling. That is, while the electric coupling portion maintains the generation of a vertical electric field that can increase the coupling between the primary coil 10 and the secondary coil 20 by using the charges present at both ends of the primary coil 10 during the resonance, the electric coupling portion may also generate the magnetic field that can enhance the coupling by using the current at this position.

Referring to FIG. 9B, the planar spiral coils 110 and 240 installed to face in the central region of the magnetic coupling portion having the tubular spiral structure are disposed at a position where the current distribution is the maximum as shown in FIG. 8 so as to generate an electric coupling while maintaining the magnetic coupling. That is, while the magnetic coupling portion maintains the generation of a vertical magnetic field that can increase the coupling between the primary coil 10 and the secondary coil 20 by using the lots of current flowing during the resonance, the magnetic coupling portion may also generate the electric field that can enhance the coupling by using the potential energy caused by the difference in the charge distribution.

As described above, the magnetic coupling portion and the electric coupling portion generate both the electric field of the capacitance component and the magnetic field of the inductance component to increase the coupling a the power receiving party by utilizing the respective currents and charges. Accordingly, a balance of the electric field and the magnetic field energy may be maintained, and the coupling between power transmitting and receiving parties may be enhanced by using all currents and charges present in the conducting wire of the primary coil 10. Thus, the primary coil 10 of the present disclosure may enable the long-range wireless power transfer and enhance the power transmission efficiency.

In addition, the primary coil 10 of the present disclosure may enable a resonance in a low frequency band since the energy stored in the electric field and the magnetic field in its vicinity may be increased. Alternatively, a size of the resonance coil may be reduced. Accordingly, the amount of space radiation may be reduced and the mounting space of the primary coil 10 may be reduced, so that wireless power transmitting device is applicable to various devices. When a capacitor or inductor element is used to reduce the size of the resonance coil, the resonance coil may be heated due to the resistance component of the element and power transmission efficiency may be lowered. According to the present disclosure, however, since the primary coil 10 may be miniaturized by disposing a pair of planar spiral coils 110 and 250 in the tubular spiral coil instead of using the capacitor or inductor element, the problem of the heat generation or the lowering of the power transmission efficiency may be obviated.

Figure 10A:
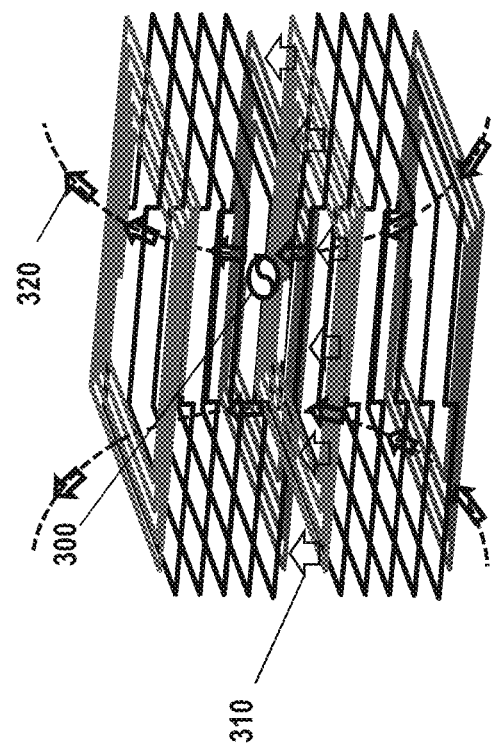
FIG. 10A illustrates an electromagnetically coupled resonance coil having a symmetrically and directly fed structure according to an exemplary embodiment of the present disclosure.
Figure 10B:
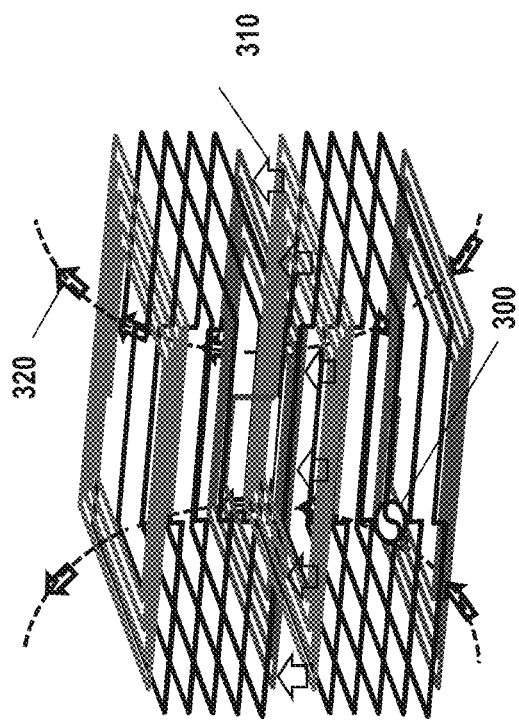
FIG. 10B illustrates an electromagnetically coupled resonance coil having an asymmetrically and directly fed structure according to an exemplary embodiment of the present disclosure.

Examples of directly-fed electromagnetically coupled resonance coil according to exemplary embodiments of the present disclosure are shown in FIGS. 10A and 10B. FIG. 10A illustrates an electromagnetically coupled resonance coil directly fed from a power source disposed symmetrically. In the embodiment of FIG. 10A, the power feeding point 300 may be disposed at a center of the electromagnetically coupled resonance coil. FIG. 10B illustrates an electromagnetically coupled resonance coil directly fed from the power source that is disposed asymmetrically. In the embodiment of FIG. 10B, the power feeding point 300 may be disposed at a position deviated from the center of the electromagnetically coupled resonance coil. In the drawings, the power source 300 may represent a power feeding point connected to the power source rather than the power source itself.

The electric field 310 generated by the magnetic coupling portion owing to the planar spiral coils 110 and 250 installed in the central region of the magnetic coupling portion has almost the same magnitude regardless of the position of the power feeding point 300. The direction of the electric field generated by the magnetic coupling portion has a component extending from a positive pole to a negative pole, and thus may coincide with the direction of the electric field generated by the electric coupling portion. The coincidence of the direction of the electric field generated by the magnetic coupling portion with the direction of the electric field generated by the electric coupling portion may maximize a sum of the electric fields and increase the coupling with the secondary coil, which increases again the power transmission efficiency and enables the long-range power transfer. In other words, the coincidence of the directions of the electric fields acts like a capacitor that helps the coupling with the secondary coil, and facilitates an adjustment of the resonance frequency and enables to maintain the coupling at a higher level.

The magnetic field 320 generated by the electric coupling portion has almost the same magnitude regardless of the position of the power feeding point 300. The electric field generated by the magnetic coupling portion is directed upward in the drawing according to Ampere's right-hand screw rule. Thus, the direction of the magnetic field generated by the electric coupling portion may coincide with the direction of the magnetic field generated by the magnetic coupling portion. The coincidence of the direction of the magnetic field generated by the electric coupling portion with the direction of the magnetic field generated by the magnetic coupling portion may maximize a sum of the magnetic fields and increase the coupling with the secondary coil, which increases again the power transmission efficiency and enables the long-range power transfer. In other words, the coincidence of the directions of the magnetic fields acts like an inductor that helps the coupling with the secondary coil, and facilitates an adjustment of the resonance frequency and enables to maintain the coupling at a higher level.

Figure 11:
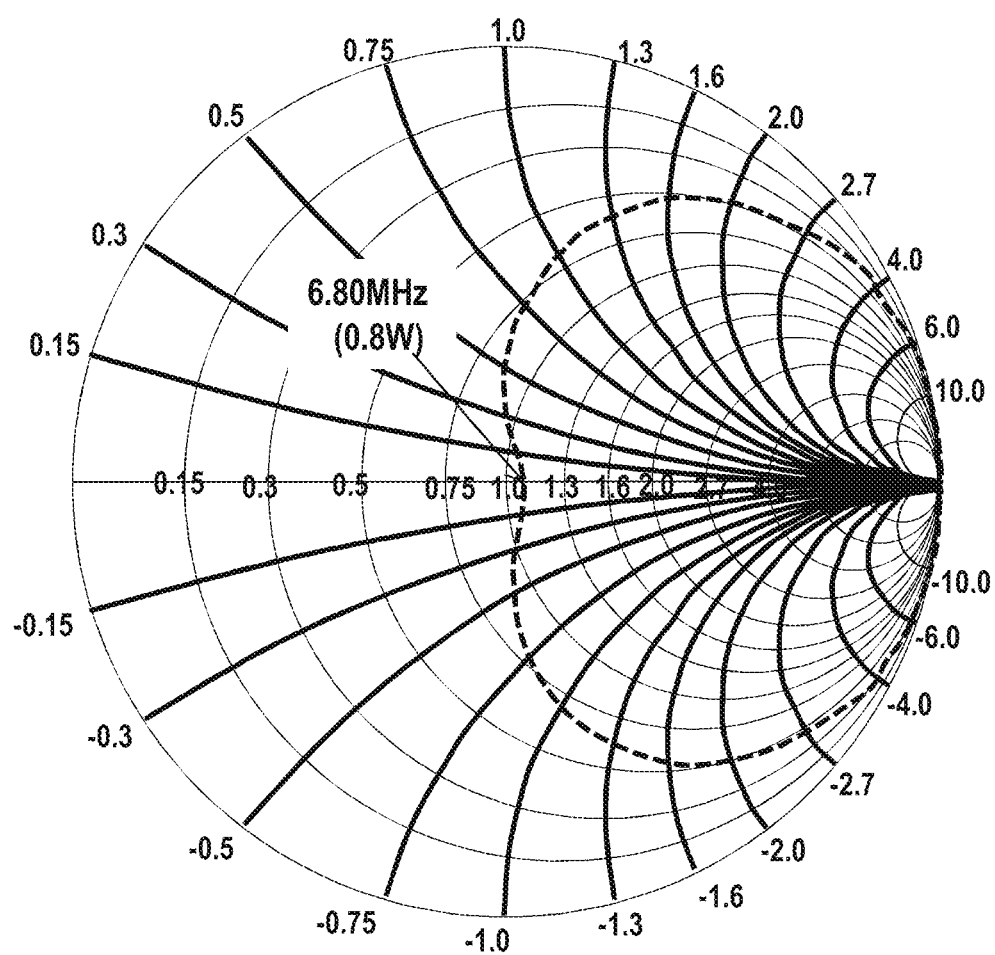
FIG. 11 is a Smith chart showing an evaluation result for the electromagnetically coupled resonance coil having the symmetrically and directly fed structure shown in FIG. 10A.

FIG. 11 is a Smith chart showing an evaluation result for the electromagnetically coupled resonance coil of the symmetrically and directly fed structure shown in FIG. 10A. If the electromagnetically coupled resonance coil having a shape of a rectangular parallelepiped is manufactured to fit into a space occupied by a conventional electromagnetically coupled resonance coil, the frequency bandwidth may be reduced by a half or more. For example, the inventors found that that the resonance frequency was reduced actually by a half when the electromagnetically coupled resonance coil having the shape of the rectangular parallelepiped was manufactured to have a size fitting into a space occupied by a conventional resonance coil having a resonance frequency of 13.5 MHz and the resonance frequency of the manufactured resonance coil was evaluated while maintaining a power transfer distance to be seven times greater than a width of the resonance coil, where the 'width of the resonance coil' means a length of a longest side of the rectangular parallelepiped.

In the electromagnetically coupled resonance coil of the symmetrically and directly fed structure, an impedance matching was achieved at 0.8 ohms ($\Omega$) at a resonance frequency of 6.80 MHz, confirming that the impedance matched well. Meanwhile, the power transfer distance of seven times the width of the resonance coil may mean a nearest distance from the primary coil to the secondary coil. This power transfer distance may correspond to a distance of about eight times the width of the resonance coil when measured based on the centers of the resonance coils. In this case, the electromagnetically coupled resonance coil was manufactured using a copper wire with a diameter of 3 millimeters (mm).

Figure 12:
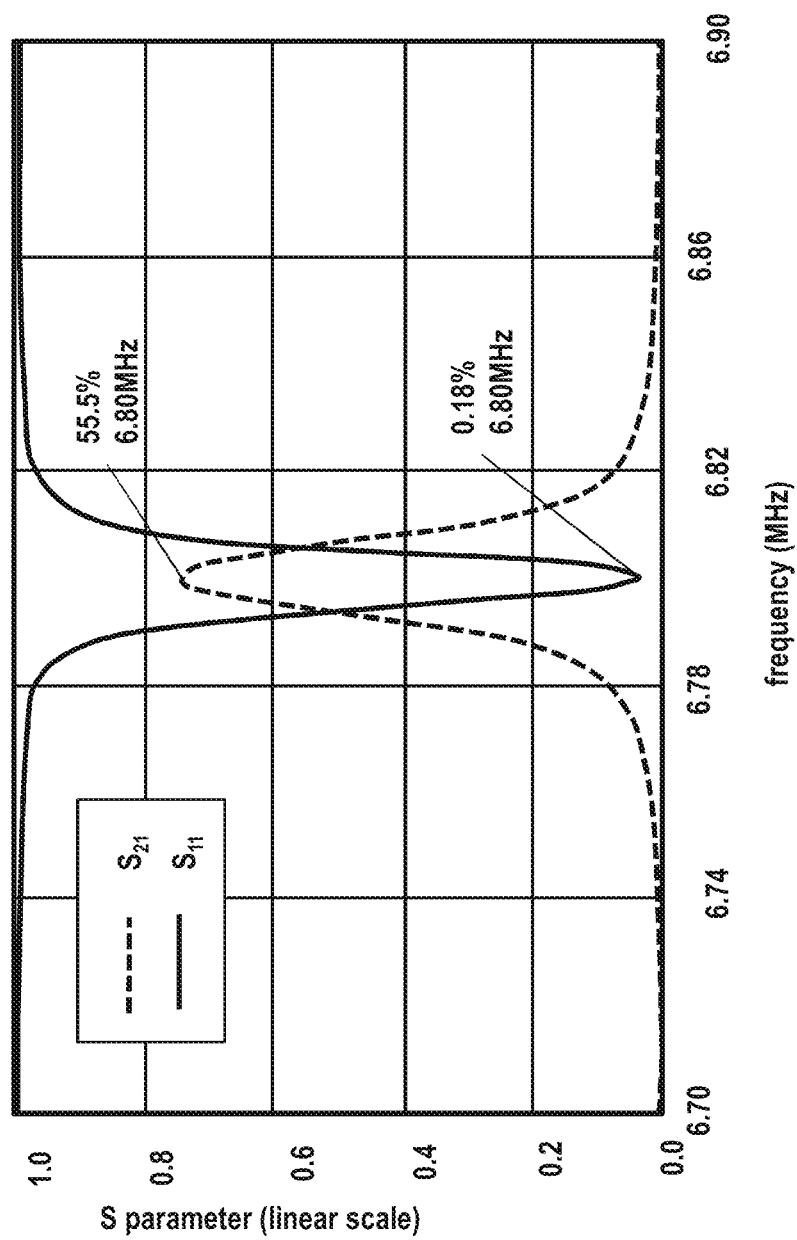
FIG. 12 is a graph showing an evaluation result of an S parameter of the electromagnetically coupled resonance coil having the symmetrically and directly fed structure shown in FIG. 10A.

FIG. 12 is a graph showing an evaluation result of an S parameter of the electromagnetically coupled resonance coil of the symmetrically and directly fed structure shown in FIG. 10A. It can be seen that the power transmission efficiency is maintained at 55.5% in the symmetrical directly-fed electromagnetically coupled resonance coil. That is, the symmetrically and directly fed resonance coil may maintain the power transmission efficiency at 50% or higher at the distance of seven times the width of the resonance coil, which is a figure of merit greatly improved compared with a conventional resonance coil.

Figure 13:
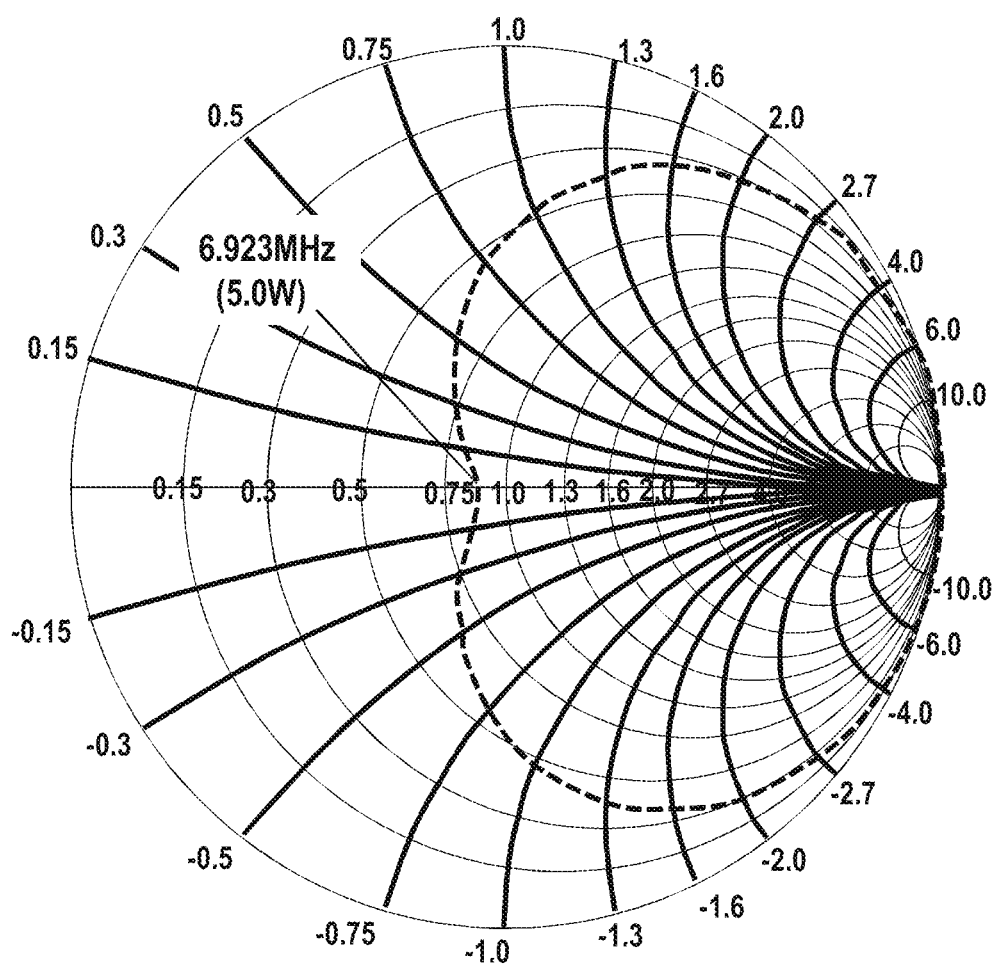
FIG. 13 is a Smith chart showing an evaluation result for the electromagnetically coupled resonance coil having the asymmetrically and directly fed structure shown in FIG. 10B.

FIG. 13 is a Smith chart showing an evaluation result for the electromagnetically coupled resonance coil of the asymmetrically and directly fed structure shown in FIG. 10B. The electromagnetically coupled resonance coil of the asymmetrically and directly fed structure used for the evaluation was manufactured to have the same shape and size as the symmetrically-fed resonance coil, but the power feeding point was provided at an asymmetric position of the resonance coil as shown in FIG. 10B. Unlike the symmetrically-fed resonance coil where the power feeding point 300 is located at the center of the resonance coil, the impedance matching was achieved at 5.0$\Omega$ at a resonance frequency. The resonance frequency is 6.923 MHz, which is slightly different from the value of the symmetrically-fed resonance coil, but the difference is not large. The matching impedance of the asymmetrically-fed resonance coil, 5.0$\Omega$, is higher than that of the symmetrically-fed resonance coil, 0.8$\Omega$, and the increase in the matching impedance may facilitate the impedance matching.

Figure 14:
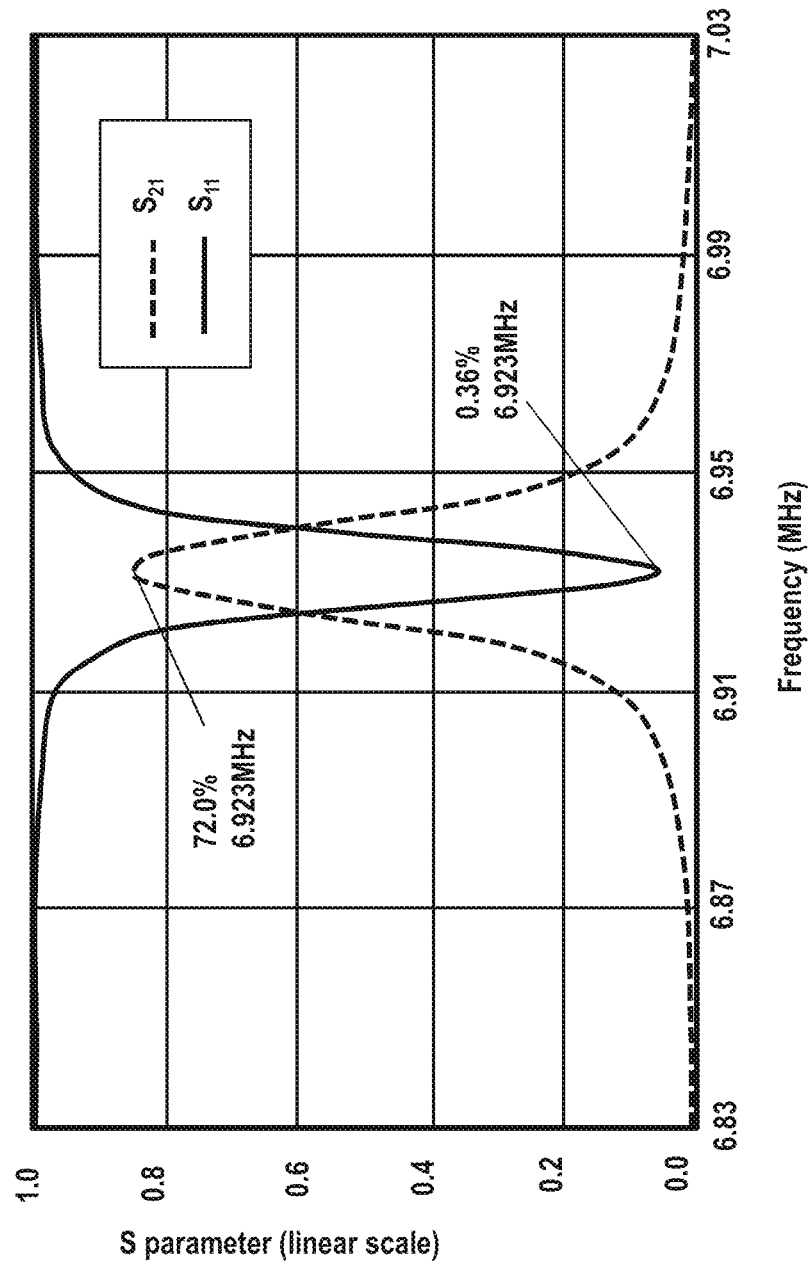
FIG. 14 is a graph showing an evaluation result of the S parameter of the electromagnetically coupled resonance coil having the asymmetrically and directly fed structure shown in FIG. 10B.

FIG. 14 is a graph showing an evaluation result of the S parameter of the electromagnetically coupled resonance coil of the asymmetrically and directly fed structure shown in FIG. 10B. It can be seen that the power transmission efficiency is improved to 72% in the electromagnetically coupled resonance coil of the asymmetrically and directly fed structure. That is, the electromagnetically coupled resonance coil of the asymmetrically and directly fed structure may maintain the power transmission efficiency at 70% or higher at the distance of seven times the width of the resonance coil, which is a figure of merit improved greatly compared with a conventional resonance coil and improved by 16.5% compared with the symmetrically and directly fed resonance coil.

Figure 15A:
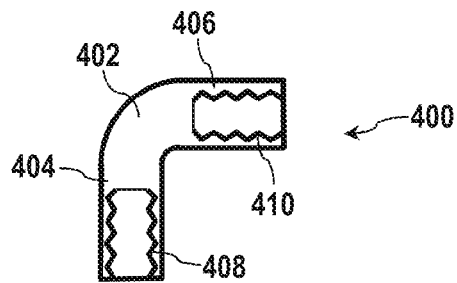
FIGS. 15A-15C show wire connectors that may be used to construct a connecting stub which connects the upper coil and the lower coil.
Figure 15B:

FIGS. 15A and 15B show wire connectors 400 and 420, respectively, that may be used to construct the connecting stub 299 which connects the upper coil 100 and the lower coil 200.

If the power transfer distance is increased and then the impedance matching is achieved to enhance the power transmission efficiency, a Q value increases and the frequency bandwidth of the resonance coil becomes narrower. Accordingly, a frequency tuning may be required to compensate for the narrow frequency bandwidth characteristics. For example, the resonance coil for use in the wireless power transmitting device need to be tuned to a frequency band of 6.78 MHz, which is the industrial, scientific and medical (ISM) radio band. The wire connectors 400 and 420 may be used to adjust the length of the connecting stub 299 in order to tune the resonance frequency of the electromagnetically coupled resonance coil. As the length of the connecting stub 299 is getting shorter, the capacitance of the resonance coil increases and the resonance frequency decreases. To the contrary, as the length of the connecting stub 299 is getting longer, the capacitance of the resonance coil decreases and the resonance frequency increases.

The wire connectors may include an L-shaped elbow connector 400 and a straight connector 420. The elbow connector 400 is bent by 90 degrees in the middle and includes two straight portions 404 and 406 extending from a bent portion 402 to respective directions perpendicular to each other. Threads 408 and 410 are formed at the ends of the straight portions 404 and 406. The straight connector 420 is rod-shaped and has threads 422 and 424 formed at both ends. In the example shown in FIGS. 15A and 15B, the threads 408 and 410 formed in the elbow connector 400 are female threads, and the threads 422 and 424 formed in the straight connector 420 are male threads. Alternatively, however, the threads 408 and 410 formed in the elbow connector 400 may be male threads, and the threads 422 and 424 formed in the straight connector 420 may be female threads. On the other hand, one of the threads 422 and 424 formed in the straight connector 420 may be a right-hand thread while the other one may be a left-hand thread. The threads 408 and 410 formed in the elbow connector 400 may be the right-hand thread or left-hand thread depending on the shape of the thread of the straight connector 420 to be coupled to the elbow connector 400.

Figure 15C:
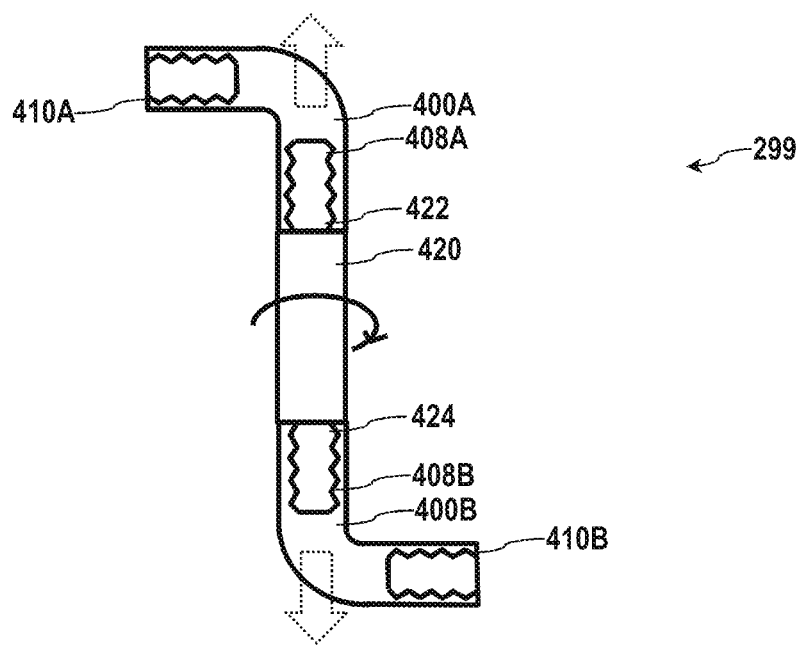

FIG. 15C shows an example of the connecting stub 299 implemented by using the wire connectors 400 and 420. The connecting stub 299 may be constructed by connecting two elbow connectors 400A and 400B to one straight connector 420. In case that a first thread 422 of the straight connector 420 is the right-hand thread, the first thread 408A of the elbow connector 400A engaging the first thread 422 of the straight connector 420 is also the right-hand thread, but a second thread 424 of the straight connector 420 and a first thread 408B of the elbow connector 400B engaging the second thread 424 of the straight connector 420 are the left-hand threads. Contrarily, when the first thread 422 of the straight connector 420 is the left-hand thread, the first thread 408A of the elbow connector 400A engaging the first thread 422 of the straight connector 420 is also the left-hand thread, but the second thread 424 of the straight connector 420 and the first thread 408B of the elbow connector 400B engaging the second thread 424 of the straight connector 420 are the right-hand threads. Meanwhile, a second thread 410A of the elbow connectors 400A may be coupled to the wire of the upper coil 100, and a second thread 410B of the elbow connectors 400B may be coupled to the wire of the lower coil 200.

If the straight connector 420 is rotated clockwise or counterclockwise when viewed from above, the elbow connectors 400A and 400B move away from a center of the straight connector 420, and the length of the connecting stub 299 becomes longer. On the contrary, if the straight connector 420 is rotated in the opposite direction, the elbow connectors 400A and 400B move toward the straight connector 420, and the length of the connecting stub 299 becomes shorter. As a result, the length of the connecting stub 299 may be adjusted by the rotation of the straight connector 420, which enables the tuning of the resonance frequency.

In an alternative embodiment, the entire electromagnetically coupled resonance coil including the upper coil 100 and the lower coil 200 may be manufactured using the wire connectors such as the elbow connector 400 and the straight connector 420. In such a case, it is easy to customize of the lengths of the wire segments, tune the resonance frequency, and mass produce the resonance coils having the same characteristics.

Figure 16:
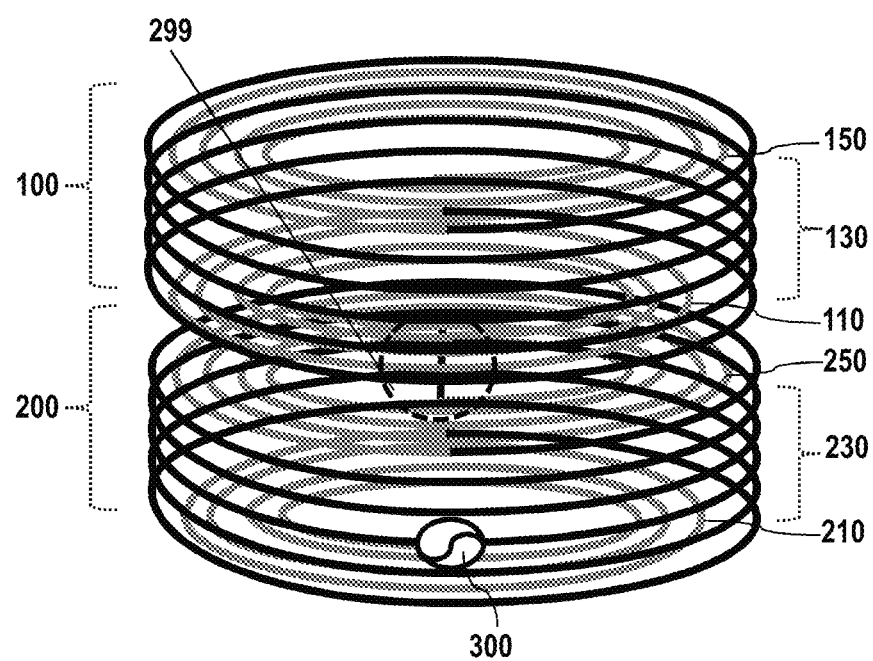
FIG. 16 illustrates a cylindrical electromagnetically coupled resonance coil having a symmetrically and directly fed structure according to another exemplary embodiment of the present disclosure.

FIG. 16 illustrates a cylindrical electromagnetically coupled resonance coil having an asymmetrically and directly fed structure according to another exemplary embodiment of the present disclosure. The electromagnetically coupled resonance coil according to the present embodiment has characteristics similar to the rectangular parallelepiped electromagnetically coupled resonance coil shown in FIG. 10B except for a circular cross section, and may enable to implement the object of the present disclosure as well. The wire connectors 400 and 420 shown in FIGS. 15A-15C may be applied to the connecting stub 299 connecting the upper coil 100 and the lower coil 200 for the frequency tuning by locally straightening bent wires at a lower end of the upper coil 100 and upper end of the lower coil 200.

Figure 17:
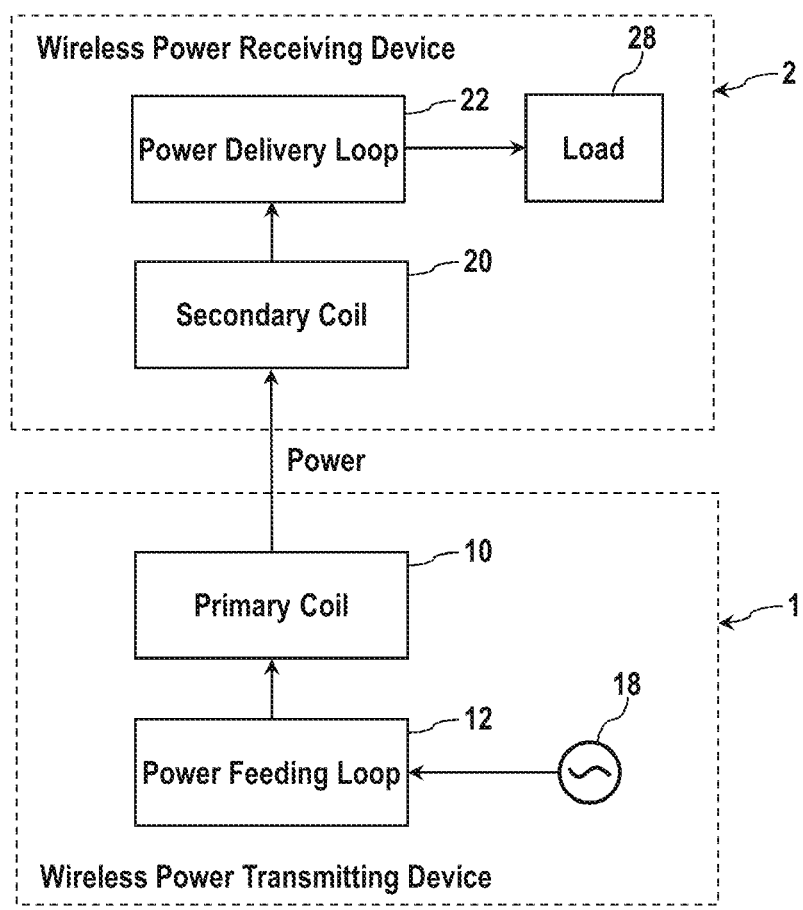
FIG. 17 is a block diagram of a wireless power transfer system according to another exemplary embodiment of the present disclosure.

FIG. 17 is a block diagram of a wireless power transfer system according to another exemplary embodiment of the present disclosure. The wireless power transmitting device 1 may transmit power to the wireless power receiving device 2 by using a strong electric field and magnetic field that may be present when an electromagnetic resonance phenomenon occurs. The wireless power transmitting device 1 may include the primary coil 10, a power feeding loop 12, and the power source 18. The wireless power receiving device 2 may include the secondary coil 20, a power delivery loop 22, and the load 28 such as a battery. The electric power from the power source 18 may be fed to the primary coil 10 indirectly, i.e. via the power feeding loop 12. When the electromagnetic resonance phenomenon occurs in the primary coil 10, the primary coil 10 generates a strong electric and magnetic fields. The primary coil 10 may transfer lots of power to the secondary coil 20 through an induction caused by the strong electric and magnetic fields. The power of the current induced in the secondary coil 20 may be provided to the load 28 through the power delivery loop 22.

Examples of indirectly-fed electromagnetically coupled resonance coil according to exemplary embodiments of the present disclosure are shown in FIGS. 18A and 18B. FIG. 18A illustrates a cylindrical electromagnetically coupled resonance coil of a loop built-in indirectly fed structure, and FIG. 18B illustrates a rectangular parallelepiped electromagnetically coupled resonance coil of a loop built-in indirectly fed structure. In the embodiments of FIGS. 18A and 18B, the power feeding loop 12 is built in an upper portion of the electromagnetic coupling resonance coil to be parallel with the primary coil 10. Alternatively, however, the power feeding loop 12 may be built in another position of the primary coil 10 or may be installed outside the primary coil 10. According to the present embodiments, an input impedance or an output impedance of the electromagnetically coupled resonance coil may be adjusted by changing the position or size of the power feeding loop 12. Considering that most RF systems are designed and manufactured to have an impedance of 50Ω or 75Ω, the adjustment of the position or size of the power feed loop 12 may be a very simple and useful way to easily achieve the impedance matching.

Figure 19:
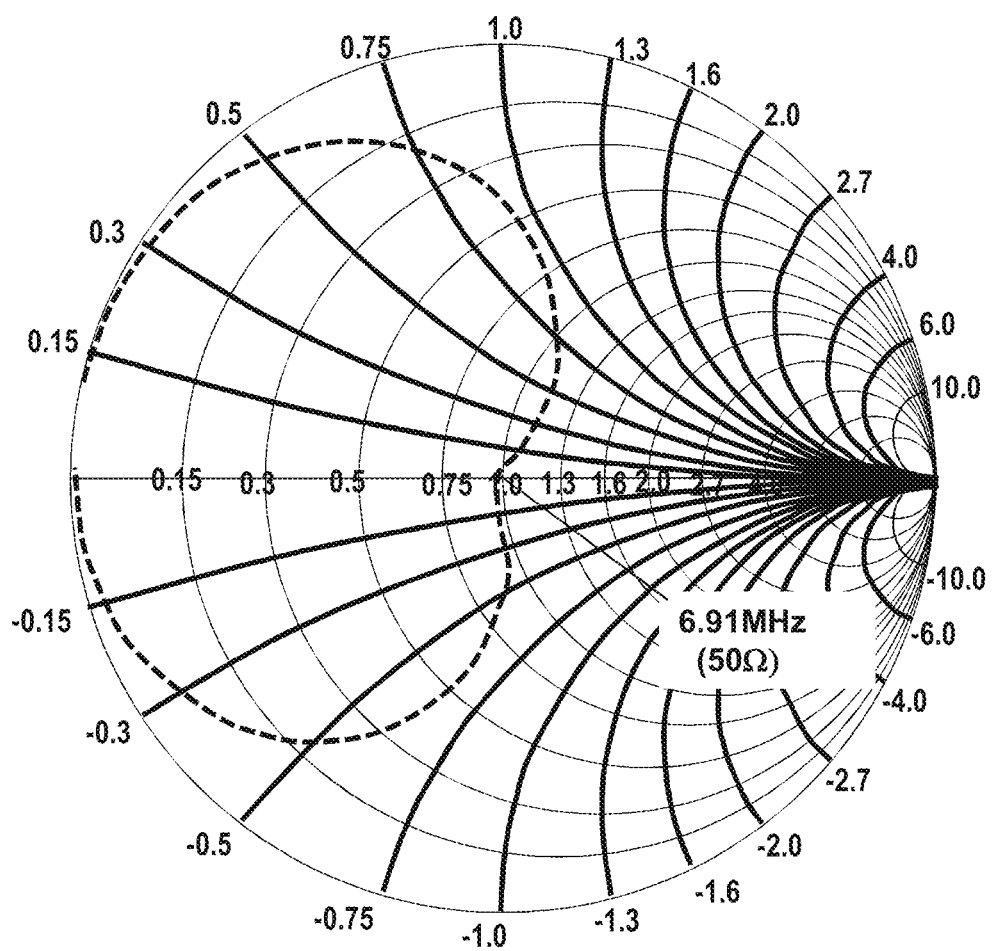
FIG. 19 is a Smith chart showing an evaluation result for the rectangular parallelepiped electromagnetically coupled resonance coil of the loop built-in indirectly fed structure shown in FIG. 18B.

FIG. 19 is a Smith chart showing an evaluation result for the rectangular parallelepiped electromagnetically coupled resonance coil of the loop built-in indirectly fed structure shown in FIG. 18B. The size and the wire diameter of the electromagnetically coupled resonance coil used for the evaluation was the same as those of the coil used for the evaluation of FIGS. 11-14, and the power feeding loop 12 was installed at an outermost opening. The power transfer distance was maintained at seven times greater than the width of the resonance coil. The impedance matching was achieved at 50Ω at a resonance frequency of 6.9 MHz, confirming that the impedance matched well.

Figure 20:
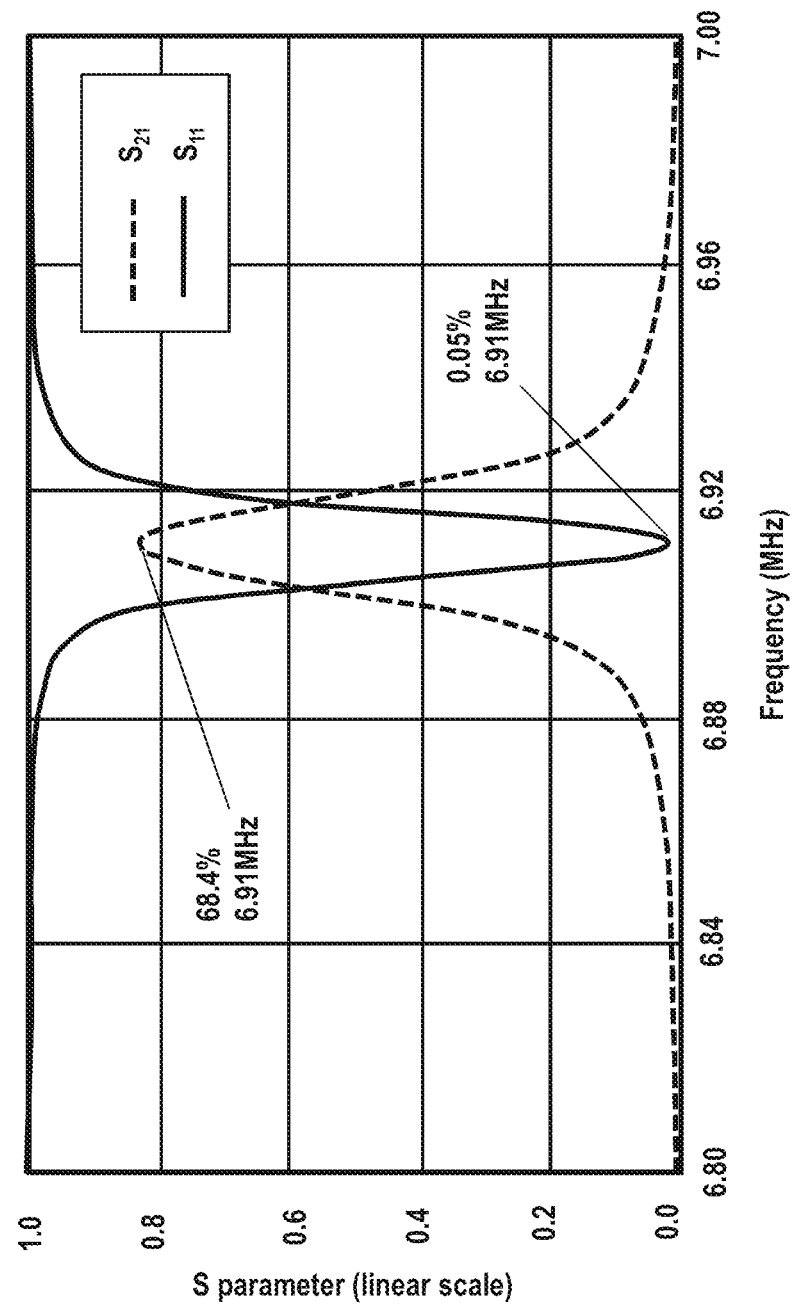
FIG. 20 is a graph showing an evaluation result of the S parameter of the electromagnetically coupled resonance coil of the loop built-in indirectly fed structure shown in FIG. 18B.

FIG. 20 is a graph showing an evaluation result of the S parameter of the electromagnetically coupled resonance coil of the loop built-in indirectly fed structure shown in FIG. 18B. The power transmission efficiency is 68.4%, which is smaller than the efficiency of the resonance coil of the asymmetrically and directly fed structure but is larger than the efficiency of the electromagnetically coupled resonance coil of the symmetrically and directly fed structure.

Figure 21:
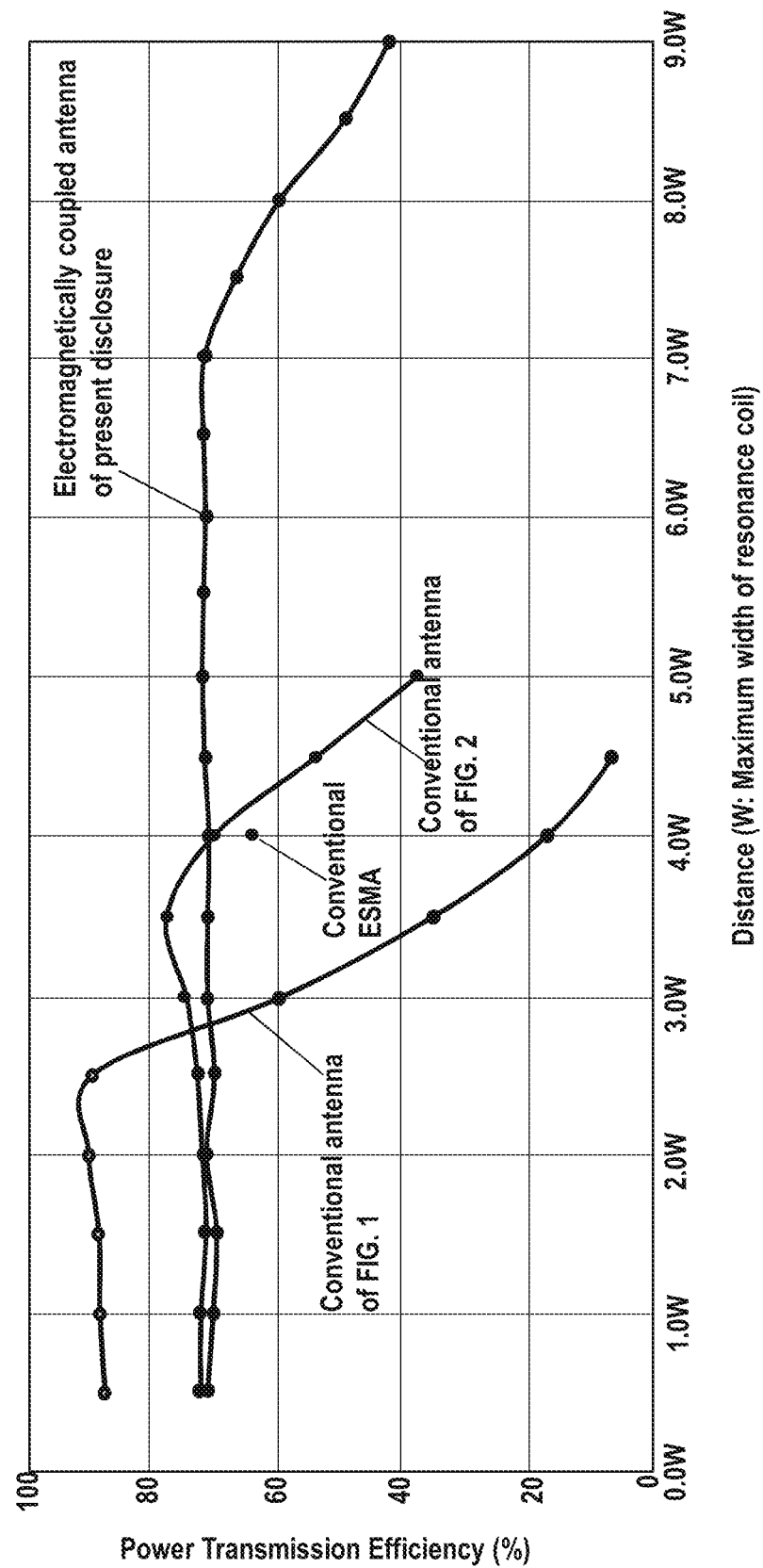
FIG. 21 is a graph comparatively showing the power transmission efficiency according to the transfer distance of the electromagnetic resonance coil according to the present disclosure with conventional resonant coils.

FIG. 21 is a graph comparatively showing the power transmission efficiency according to the transfer distance of the electromagnetic resonance coil according to the present disclosure with the conventional magnetically coupled resonance coil shown of FIG. 1, the conventional electromagnetically coupled resonance coil of FIG. 2, and a conventional Electronically Steered Multi-beam Antenna (ESMA). The electromagnetic resonance coil according to the present disclosure shown in the graph was manufactured by using a copper wire with a diameter of 5 mm rather than 3 mm and was indirectly fed by the feeding loop, and the impedance matching was achieved at 50Ω. In the case of using a copper wire with a diameter of 5 mm rather than a copper wire with a diameter of 3 mm, the power transmission efficiency increases by about 6% at the transfer distance of seven times the resonance coil width because a resistance of the wire is reduced. In other words, the power transmission efficiency of a thick conductor is increased since the resistive component and a resultant heat loss is reduced. In the drawings, it can be seen that the electromagnetic resonance coil of the present disclosure reveals an enhanced power transfer distance and transfer efficiency compared to those of the conventional coils.

Figure 22:
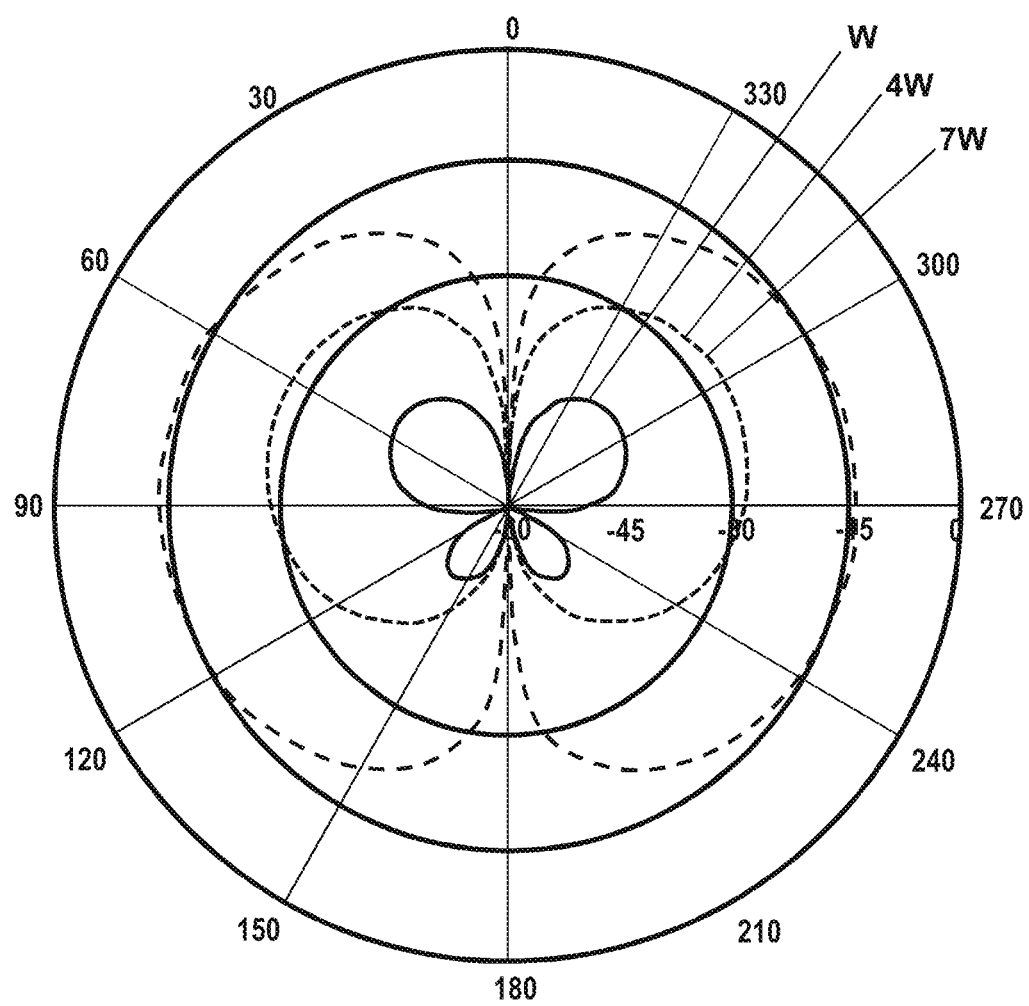
FIG. 22 illustrates a spatial radiation of the rectangular parallelepiped electromagnetically coupled resonance coil of the loop built-in indirectly fed structure shown in FIG. 18B.

FIG. 22 illustrates a spatial radiation of the rectangular parallelepiped electromagnetically coupled resonance coil of the loop built-in indirectly fed structure shown in FIG. 18B. The spatial radiation pattern was measured by an actual gain in all directions while varying the power transfer distance. When the power transfer distance is W, where 'W' denotes the width of the resonance coil, the maximum spatial radiation is −41 dB. When the power transfer distance is 4W, the maximum spatial radiation is −27 dB. When the power transfer distance is 7W, the maximum spatial radiation reaches −14 dB. Although the transfer at 7W is a medium range transfer, the evaluation revealed that the radiation amount of the electromagnetically coupled resonant coil according to the present disclosure was almost the same as that of the conventional resonance coil of FIG. 1 which is known as a non-radiation type resonant coil and is dedicated for a short range transfer.

Figure 23B:
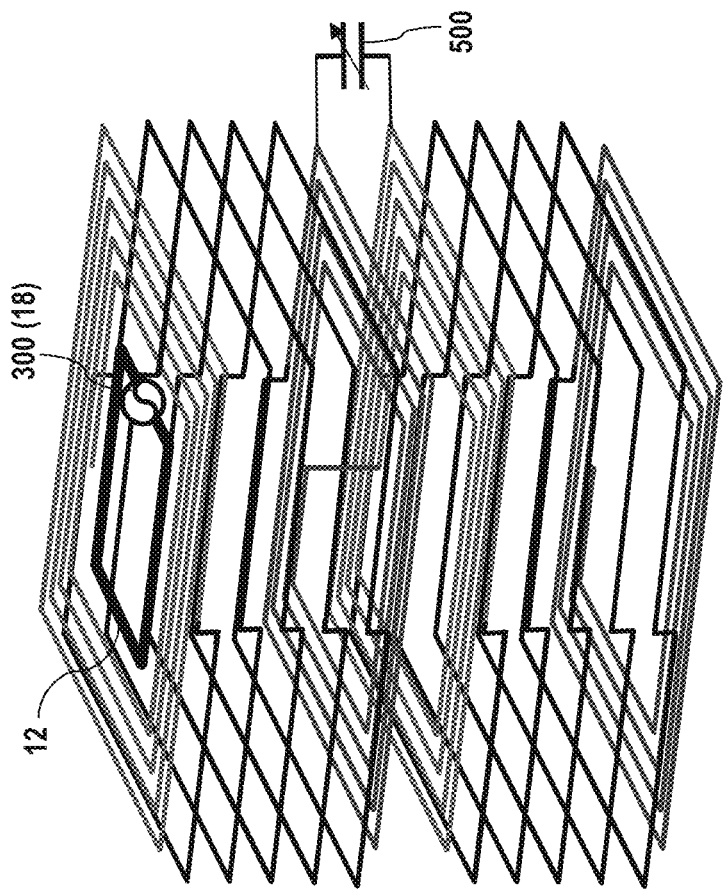
FIGS. 23A and 23B illustrate electromagnetically coupled resonance coils of the loop built-in indirectly fed structure according to another exemplary embodiments of the present disclosure.
Figure 23A:
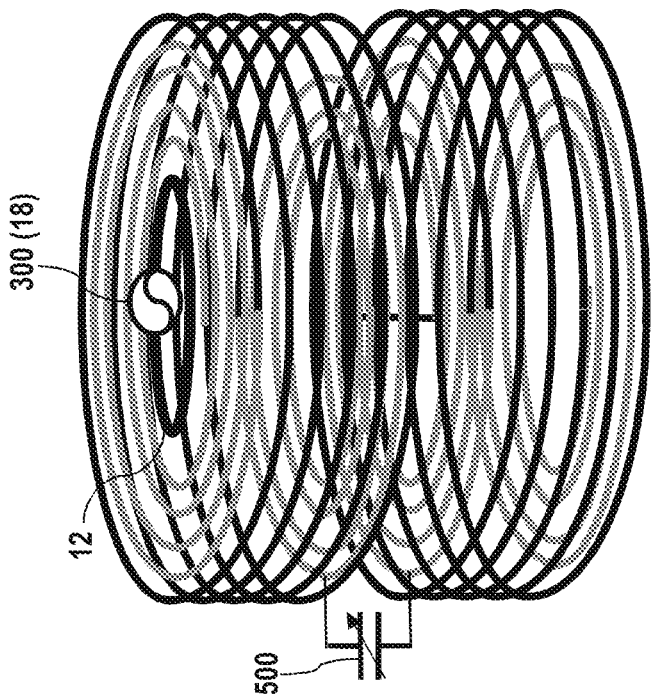

FIGS. 23A and 23B illustrate electromagnetically coupled resonance coils of the loop built-in indirectly fed structure according to another exemplary embodiments of the present disclosure. The electromagnetically coupled resonance coils shown in FIGS. 23A and 23B are similar to those shown in FIGS. 18A and 18B, respectively, except that a capacitor 500 is added. The capacitor 500 may be a variable capacitor. When the tuning of the resonance frequency tuning is difficult because the size of the device is fixed, the capacitor 500 may solve the tuning problem and enable a frequent tuning and can be easily implemented. The capacitance of the variable capacitor may be adjusted by software through a digital control device. In particular, when the capacitor 500 is installed between the upper coil 100 and the lower coil 200, the voltage across the capacitor 500 is small compared to the case where the capacitor is installed at the feeding point. In such a case, there will be little problem related to a voltage rating of the capacitor, the current passing through the capacitor is reduced because the capacitor is connected in parallel to the coil wiring, and a heat loss caused by the equivalent series resistance (ESR) of the capacitor may be reduced.

The capacitor is also applicable to the electromagnetically coupled resonant coils according to the other embodiments. For example, FIGS. 24A and 24B illustrate electromagnetically coupled resonance coils of the asymmetric directly-fed structure according to another exemplary embodiments of the present disclosure. The electromagnetic coupling resonant coils shown in 24A and 24B are configured based on the resonant coils shown in FIGS. 10B and 16, respectively, and include the capacitor 500. Since other features of the resonance coils of FIGS. 24A and 24B are apparent from the above description, detailed descriptions thereof will be omitted for simplicity.

The operation of the devices according to exemplary embodiments of the present disclosure may be controlled by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An antenna device for transmitting power by wireless power transfer, comprising:
    an upper coil comprising a first tubular spiral coil and a first planar spiral coil disposed beneath the first tubular spiral coil;
    a lower coil comprising a second planar spiral coil disposed to face the first planar spiral coil and a second tubular spiral coil disposed beneath the second planar spiral coil;
    a connecting stub configured to connect the upper coil and the lower coil to each other; and
    a power source configured to supply a power to the upper coil or the lower coil, wherein the first planar spiral coil and the second planar spiral coil generate an electric field and a magnetic field in a resonance state to transfer at least some of the power from the power source to an external wireless power receiving device through the electric field and the magnetic field.

2. The antenna device of claim 1, further comprising:
a capacitor connected between the upper coil and the lower coil in an electrical parallel with the connecting hub.

3. The antenna device of claim 1,
wherein the upper coil further comprises a third planar spiral coil disposed on the first tubular spiral coil,
wherein the lower coil further comprises a fourth planar spiral coil disposed beneath the second tubular spiral coil.

4. The antenna device of claim 1, wherein each of the first and second tubular spiral coils comprises:
a plurality of turns of wire having a shape wound along an outer circumferential surface of one selected from a three-dimensional object group consisting of a rectangular parallelepiped, a polygon column, a cylinder, an elliptic cylinder.

5. The antenna device of claim 4, wherein each of the first and second planar spiral coils comprises:
a spirally wound conductor having a shape of a rectangular, polygonal, circular, or oval disk.

6. The antenna device of claim 1, further comprising:
a power feeding loop disposed to be parallel with the upper coil and the lower coil and spaced apart from the upper coil and the lower coil,
wherein the power source supplies the power to the upper coil or the lower coil through the power feeding loop.

7. The antenna device of claim 6, wherein the power supply loop receives an electrical energy from the power source and generates an electromagnetic field to indirectly supply the power to the upper coil or the lower coil.

8. The antenna device of claim 1, wherein a length of the connecting stub is adjustable to allow a change of a resonance frequency of the wireless power transmitting device.

9. An antenna device for receiving power by wireless power transfer, comprising:
an upper coil comprising a first tubular spiral coil and a first planar spiral coil disposed beneath the first tubular spiral coil;
a lower coil comprising a second planar spiral coil disposed to face the first planar spiral coil and a second tubular spiral coil disposed beneath the second planar spiral coil;
a connecting stub configured to connect the upper coil and the lower coil to each other; and
a load configured to receive a power from the upper coil or the lower coil,
wherein the first planar spiral coil and the second planar spiral coil are configured to receive power transmitted by an external wireless power transmitting device and deliver the power to the load.

10. The antenna device of claim 9, further comprising:
a capacitor connected between the upper coil and the lower coil in an electrical parallel with the connecting hub.

11. The antenna device of claim 9,
wherein the upper coil further comprises a third planar spiral coil disposed on the first tubular spiral coil,
wherein the lower coil further comprises a fourth planar spiral coil disposed beneath the second tubular spiral coil.

12. The antenna device of claim 9, wherein each of the first and second tubular spiral coils comprises:
a plurality of turns of wire having a shape wound along an outer circumferential surface of one selected from a three-dimensional object group consisting of a rectangular parallelepiped, a polygon column, a cylinder, an elliptic cylinder.

13. The antenna device of claim 12, wherein each of the first and second planar spiral coils comprises:
a spirally wound conductor having a shape of a rectangular, polygonal, circular, or oval disk.

14. The antenna device of claim 9, further comprising:
a power delivery loop disposed to be parallel with the upper coil and the lower coil and spaced apart from the upper coil and the lower coil,
wherein the load receives the power from the upper coil or the lower coil through the power delivery loop.

15. The antenna device of claim 14, wherein the power delivery loop provides the load with an electrical energy associated with a current induced by an electromagnetic field generated by the upper coil or the lower coil.

16. The antenna device of claim 9, wherein a length of the connecting stub is adjustable to allow a change of a resonance frequency of the wireless power transmitting device.

* * * * *